US012772304B2

(12) United States Patent
Naik et al.

(10) Patent No.: US 12,772,304 B2
(45) Date of Patent: Oct. 20, 2026

(54) ANNOUNCING OPPORTUNISTIC PRIMARY CHANNEL SWITCHING

(71) Applicant: QUALCOMM Incorporated, San Diego, CA (US)

(72) Inventors: Gaurang Naik, San Diego, CA (US); Abhishek Pramod Patil, San Diego, CA (US); George Cherian, San Diego, CA (US); Alfred Asterjadhi, San Diego, CA (US); Sai Yiu Duncan Ho, San Diego, CA (US); Giovanni Chisci, San Diego, CA (US); Sanket Sanjay Kalamkar, San Diego, CA (US); Sherief Helwa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 18/673,198

(22) Filed: May 23, 2024

(65) Prior Publication Data

US 2025/0261253 A1 Aug. 14, 2025

Related U.S. Application Data

(60) Provisional application No. 63/553,412, filed on Feb. 14, 2024.

(51) Int. Cl.
*H04W 76/10* (2018.01)
*H04W 72/0453* (2023.01)
(Continued)

(52) U.S. Cl.
CPC ....... *H04W 76/10* (2018.02); *H04W 72/0453* (2013.01); *H04W 72/51* (2023.01); *H04W 76/20* (2018.02)

(58) Field of Classification Search
CPC ............. H04W 72/0453; H04W 72/51; H04W 72/512; H04W 72/12; H04W 76/10; H04W 76/20; H04W 84/12; H04W 36/06
(Continued)

(56) References Cited

U.S. PATENT DOCUMENTS 7,606,193 B2 * 10/2009 McFarland ........... H04W 24/04 370/441
9,191,928 B2 11/2015 Seok
(Continued)

FOREIGN PATENT DOCUMENTS

CN 115243333 A 10/2022
WO WO-2022260486 A1 12/2022

OTHER PUBLICATIONS

Fisher, Wayne. "IEEE P802.11 Wireless LANs TGp Comment Resolution Annex I and J Changes" IEEE 802.11-06/1144r2 Aug. 2006. (Year: 2006).*
(Continued)

*Primary Examiner* — Stephen J Clawson
(74) *Attorney, Agent, or Firm* — Holland & Hart LLP

(57) ABSTRACT

This disclosure provides methods, components, devices and systems for announcing opportunistic primary channel switching. Various aspects generally relate to a channel switch announcement (CSA) element that may announce an opportunistic primary (O-Primary) channel switch. Various aspects relate more specifically to an expanded channel switch mode field of a CSA element that may indicate whether a wireless station (STA) is permitted to transmit via the first O-Primary channel during the switch, whether a new operating class field is present in the CSA element, and an index associated with the switched O-Primary channel. In some aspects, the CSA element may be a separate information element, or an element defined within a non-primary channel access (NPCA) wrapper. The AP may transmit the
(Continued)

1000

CSA element via a beacon frame, a probe response frame, or a dedicated channel switch announcement frame.

52 Claims, 11 Drawing Sheets

(51) Int. Cl.
*H04W 72/51* (2023.01)
*H04W 76/20* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 11,283,475 | B1 | 3/2022 | Tsai et al. | |
| 11,723,006 | B2 | 8/2023 | Naribole et al. | |
| 2008/0137545 | A1 | 6/2008 | Shiue et al. | |
| 2011/0096747 | A1* | 4/2011 | Seok | H04W 74/002 370/329 |
| 2014/0098744 | A1* | 4/2014 | Yucek | H04W 72/12 370/328 |
| 2021/0099926 | A1* | 4/2021 | Chen | H04W 36/362 |
| 2021/0266960 | A1 | 8/2021 | Lu et al. | |
| 2021/0274500 | A1* | 9/2021 | Cariou | H04W 48/08 |
| 2021/0289499 | A1* | 9/2021 | Naribole | H04W 72/0453 |
| 2023/0300696 | A1 | 9/2023 | Fang et al. | |
| 2024/0022955 | A1 | 1/2024 | Kuppa et al. | |
| 2025/0365770 | A1* | 11/2025 | Zhou | H04W 36/06 |

OTHER PUBLICATIONS

International Search Report and Written Opinion—PCT/US2025/011857—ISA/EPO—Apr. 3, 2025.

* cited by examiner

ANNOUNCING OPPORTUNISTIC PRIMARY CHANNEL SWITCHING

CROSS REFERENCE

The present Application for Patent claims the benefit of U.S. Provisional Patent Application No. 63/553,412 by NAIK et al., entitled "ANNOUNCING OPPORTUNISTIC PRIMARY CHANNEL SWITCHING," filed Feb. 14, 2024, assigned to the assignee hereof, and expressly incorporated by reference in its entirety herein.

TECHNICAL FIELD

This disclosure relates generally to wireless communication and, more specifically, to announcing channel switches for opportunistic primary channels.

DESCRIPTION OF THE RELATED TECHNOLOGY

Wireless communication networks are widely deployed to provide various types of communication content such as voice, video, packet data, messaging, broadcast, and so on. Some wireless communication networks may be capable of supporting communication with multiple users by sharing the available system resources (such as time, frequency, or power). Further, a wireless communication network may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM), among other examples. Wireless communication devices may communicate in accordance with any one or more of such wireless communication technologies, and may include wireless stations (STAs), wireless access points (APs), user equipment (UEs), network entities, or other wireless nodes.

In some wireless local area networks (WLANs), for ultra-high reliability (UHR), an AP and a station (STA), which may include examples of UEs, may communicate via one or more channels in a basic service set (BSS) operating bandwidth. The one or more channels may include a first baseline or primary channel, such as a main primary (M-Primary) channel, and one or more second primary channels, such as one or more or additional or opportunistic primary (O-Primary) channels. A STA may monitor an O-Primary channel in examples in which the STA detects overlapping BSSs (OBSSs) via the M-Primary channel.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. The method may include establishing a wireless communication link between a wireless AP and a wireless STA, transmitting, to the wireless STA, a frame including an indication to perform a channel switch operation associated with one or more O-Primary channels associated with the wireless communication link that are different than a M-Primary channel associated with the wireless communication link, and performing the channel switch operation to switch the one or more O-Primary channels in accordance with transmitting the indication to perform the channel switch operation.

Another innovative aspect of the subject matter described in this disclosure can be implemented in a wireless AP for wireless communication. The wireless AP may include a processing system that includes processor circuitry and memory circuitry that stores code. The processing system may be configured to cause the wireless AP to establish a wireless communication link between the wireless AP and a wireless STA, transmit, to the wireless STA, a frame including an indication to perform a channel switch operation associated with one or more O-Primary channels associated with the wireless communication link that are different than a M-Primary channel associated with the wireless communication link, and perform the channel switch operation to switch the one or more O-Primary channels in accordance with transmitting the indication to perform the channel switch operation.

Another innovative aspect of the subject matter described in this disclosure can be implemented in another wireless AP for wireless communication. The wireless AP may include means for establishing a wireless communication link between the wireless AP and a wireless STA, means for transmitting, to the wireless STA, a frame including an indication to perform a channel switch operation associated with one or more O-Primary channels associated with the wireless communication link that are different than a M-Primary channel associated with the wireless communication link, and means for performing the channel switch operation to switch the one or more O-Primary channels in accordance with transmitting the indication to perform the channel switch operation.

Another innovative aspect of the subject matter described in this disclosure can be implemented in a non-transitory computer-readable medium storing code for wireless communication. The code may include instructions executable by one or more processors to establish a wireless communication link between a wireless AP and a wireless STA, transmit, to the wireless STA, a frame including an indication to perform a channel switch operation associated with one or more O-Primary channels associated with the wireless communication link that are different than a M-Primary channel associated with the wireless communication link, and perform the channel switch operation to switch the one or more O-Primary channels in accordance with transmitting the indication to perform the channel switch operation.

In some examples of the method, wireless APs, and non-transitory computer-readable medium described herein, the frame includes a CSA element that includes a channel switch mode field including one or more bits indicating whether the wireless STA may be permitted to transmit via the one or more O-Primary channels.

In some examples of the method, wireless APs, and non-transitory computer-readable medium described herein, the frame includes a CSA element that includes one or more bits indicating whether the CSA element includes a new operating class field indicating a value of an operating class associated with a new channel of the one or more O-Primary channels.

In some examples of the method, wireless APs, and non-transitory computer-readable medium described herein, the frame includes a respective CSA element corresponding to each of the one or more O-Primary channels and each respective CSA element includes an O-Primary channel identifier (ID) field indicating a respective index of a respective O-Primary channel of the one or more O-Primary channels.

One innovative aspect of the subject matter described in this disclosure can be implemented in a method for wireless communication by a wireless STA. The method may include establishing a wireless communication link between the wireless STA and a wireless AP and receiving, from the wireless AP, a frame including an indication to perform a channel switch operation associated with one or more O-Primary channels associated with the wireless communication link that are different than a M-Primary channel associated with the wireless communication link.

Another innovative aspect of the subject matter described in this disclosure can be implemented in a wireless STA for wireless communication. The wireless STA may include a processing system that includes processor circuitry and memory circuitry that stores code. The processing system may be configured to cause the wireless STA to establish a wireless communication link between the wireless AP and a wireless AP and receive, from the wireless AP, a frame including an indication to perform a channel switch operation associated with one or more O-Primary channels associated with the wireless communication link that are different than a M-Primary channel associated with the wireless communication link.

Another innovative aspect of the subject matter described in this disclosure can be implemented in another wireless STA for wireless communication. The wireless STA may include means for establishing a wireless communication link between the wireless STA and a wireless AP and means for receiving, from the wireless AP, a frame including an indication to perform a channel switch operation associated with one or more O-Primary channels associated with the wireless communication link that are different than a M-Primary channel associated with the wireless communication link.

Another innovative aspect of the subject matter described in this disclosure can be implemented in a non-transitory computer-readable medium storing code for wireless communication. The code may include instructions executable by one or more processors to establish a wireless communication link between a wireless AP and a wireless AP and receive, from the wireless AP, a frame including an indication to perform a channel switch operation associated with one or more O-Primary channels associated with the wireless communication link that are different than a M-Primary channel associated with the wireless communication link.

Some examples of the method, wireless STAs, and non-transitory computer-readable medium described herein may further include operations, features, means, or instructions for performing the channel switch operation to switch the one or more O-Primary channels in accordance with receiving the indication to perform the channel switch operation.

Some examples of the method, wireless STAs, and non-transitory computer-readable medium described herein may further include operations, features, means, or instructions for disabling a NPCA mode in accordance with determining not to perform the channel switch operation.

Some examples of the method, wireless STAs, and non-transitory computer-readable medium described herein may further include operations, features, means, or instructions for performing a second channel switch operation to switch the one or more O-Primary channels, where one or more new O-Primary channels associated with the second channel switch operation may be different from one or more new O-Primary channels associated with the indication to perform the channel switch operation.

In some examples of the method, wireless STAs, and non-transitory computer-readable medium described herein, the frame includes a CSA element that includes a channel switch mode field including one or more bits indicating whether the wireless STA may be permitted to transmit via the one or more O-Primary channels.

In some examples of the method, wireless STAs, and non-transitory computer-readable medium described herein, the frame includes a CSA element that includes one or more bits indicating whether the CSA element includes a new operating class field indicating a value of an operating class associated with a new channel of the one or more O-Primary channels.

In some examples of the method, wireless STAs, and non-transitory computer-readable medium described herein, the frame includes a respective CSA element corresponding to each of the one or more O-Primary channels and each respective CSA element includes an O-Primary channel ID field indicating a respective index of a respective O-Primary channel of the one or more O-Primary channels.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
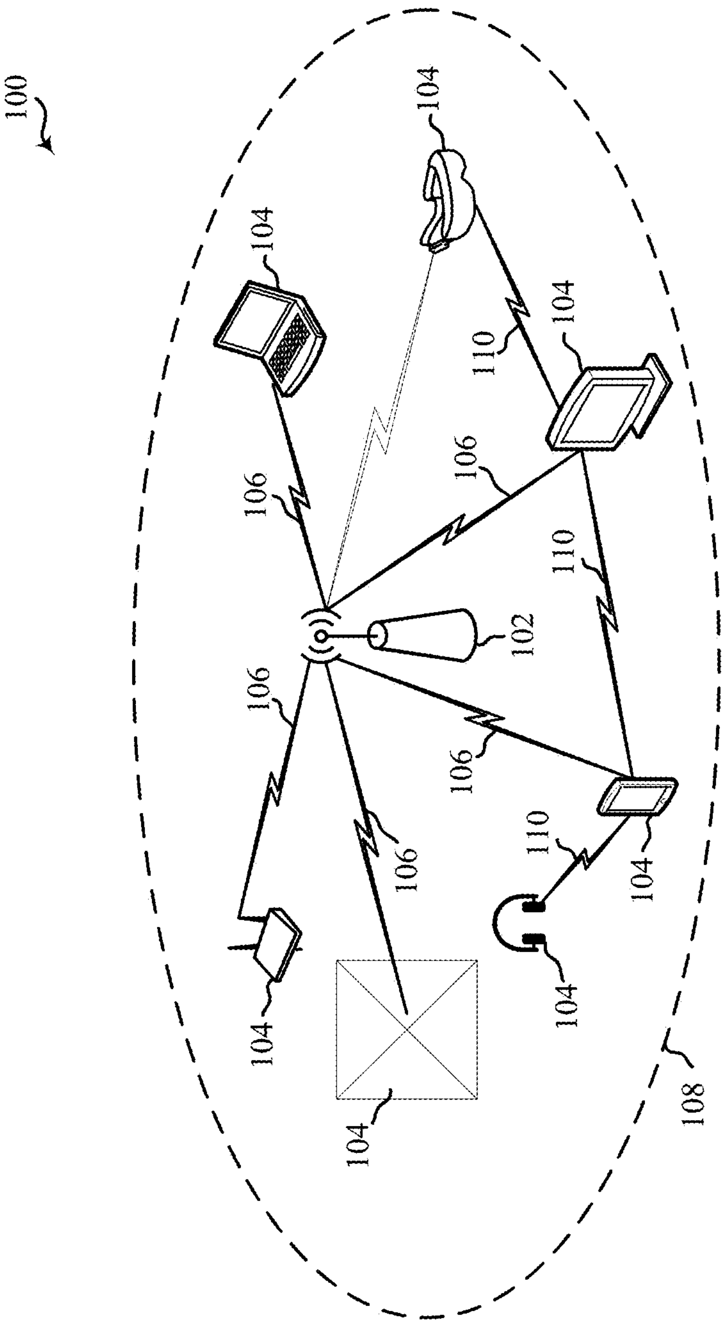
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3rd Generation Partnership Project (3GPP), among others. The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IoT) network.

In WLAN communication, an AP may communicate with a STA via a first primary channel, such as a main primary (M-Primary) channel, and a second primary channel, such as an opportunistic primary (O-Primary) channel. The AP and the STA may communicate via the O-Primary channel in examples in which traffic associated with the M-Primary channel exceeds a threshold. In some examples, the AP may switch the M-Primary channel from a first bandwidth, such as a first 20 MHz bandwidth, to a second bandwidth, such as a second 20 MHz bandwidth. The AP may indicate the channel switch via a channel switch announcement (CSA) element. In some examples, the AP may change (such as switch) the O-Primary channel for different reasons, such as that the O-Primary channel may fall outside of a basic service set (BSS) bandwidth from the M-Primary channel or the AP may determine to switch the M-Primary channel and the O-Primary channel based on detecting a change in channel metrics and/or based on detecting overlapping BSSs (OBSSs) in one or more of the M-Primary channel or the O-Primary channel.

Various aspects generally relate to methods for an AP to transmit a frame to an STA including an indication, such as a modified CSA element or a modified extended CSA (ECSA) element, that may announce an O-Primary channel switch. Various aspects relate more specifically to an expanded channel switch mode field of a CSA element or the ECSA element that may indicate whether the STA is permitted to transmit via the first O-Primary channel during the switch, whether a new operating class field is present in the CSA element or ECSA element, and/or an index associated with the O-Primary channel that the AP is switching. In some aspects, the CSA element or the ECSA element may be a separate information element from others or may be an element defined within a non-primary channel access (NPCA) wrapper. The AP may transmit the CSA element or the ECSA element via a beacon frame, a probe response frame, or a dedicated channel switch announcement frame, among other examples. The AP and/or the STA may perform the indicated channel switch operation of the O-Primary channel in accordance with the indication.

Particular aspects of the subject matter described in this disclosure may be implemented to realize one or more of the following potential advantages. The techniques employed by the described communication devices may reduce latency and increase quality of communication. In some examples, operations performed by the described communication devices may decrease latency by allowing APs to dynamically change O-Primary channels to account for channel metrics, such as traffic and channel quality. In some examples, operations performed by the described communication devices may support improvements to reliability, increased coordination between devices, and improved utilization of resources, among other benefits, by allowing APs to dynamically switch bandwidths used for O-Primary channels and to indicate channel switches to STAs. In some examples, by transmitting the modified CSA via a NPCA wrapper element and/or by including a field in the modified CSA element to indicate whether the modified CSA element comprises a new operating class field, the AP may indicate an O-Primary channel switch without consuming one or more additional element identifiers (IDs), which may result in relatively more efficient use of communication resources, among other various benefits.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bc, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices including at least one wireless access point (AP) 102 and any number of wireless stations (STAs) 104. While only one AP 102 is shown with reference to FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (such as TVs, computer monitors or video gaming consoles), video game controllers, navigation systems, music or other audio or stereo devices, remote control devices, printers, kitchen appliances (including smart refrigerators) or other household appliances, key fobs (such as for passive keyless entry and start (PKES) systems), Internet of Things (IoT) devices, and vehicles, among other examples.

A single AP 102 and an associated set of STAs 104 may be referred to as a BSS, which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communication (hereinafter also referred to as "Wi-Fi communication" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communication. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple subbands and frequency channels (also referred to as subchannels). The terms "channel" and "subchannel" may be used interchangeably herein, as each may refer to a portion of frequency spectrum within a frequency band (such as a 20 MHz, 40 MHz, 80 MHz, or 160 MHz portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

An AP 102 may determine or select an operating or operational bandwidth for the STAs 104 in its BSS and select a range of channels within a band to provide that operating bandwidth. For example, the AP 102 may select sixteen 20 MHz channels that collectively span an operating bandwidth of 320 MHz. Within the operating bandwidth, the AP 102 may typically select a single primary 20 MHz channel on which the AP 102 and the STAs 104 in its BSS monitor for contention-based access schemes. In some examples, the AP 102 or the STAs 104 may be capable of monitoring only a single primary 20 MHz channel for packet detection (such as for detecting preambles of PPDUs). Conventionally, any transmission by an AP 102 or a STA 104 within a BSS must involve transmission on the primary 20 MHz channel. As such, in conventional systems, the transmitting device must contend on and win a TXOP on the primary channel to transmit anything at all. However, some APs 102 and STAs 104 supporting ultra-high reliability (UHR) communication or communication according to the IEEE 802.11bn standard amendment can be configured to operate, monitor, contend and communicate using multiple primary 20 MHz channels. Such monitoring of multiple primary 20 MHz channels may be sequential such that responsive to determining, ascertaining or detecting that a first primary 20 MHz channel is not available, a wireless communication device may switch to monitoring and contending using a second primary 20 MHz channel. Additionally, or alternatively, a wireless communication device may be configured to monitor multiple primary 20 MHz channels in parallel. In some examples, a first primary 20 MHz channel may be referred to as a M-Primary channel and one or more additional, second primary channels may each be referred to as an O-Primary channel. For example, if a wireless communication device measures, identifies, ascertains, detects, or otherwise determines that the M-Primary channel is busy or occupied (such as due to an overlapping BSS (OBSS) transmission), the wireless communication device may switch to monitoring and contending on an O-Primary channel. In some examples, the M-Primary channel may be used for beaconing and serving legacy client devices and an O-Primary channel may be specifically used by non-legacy (such as UHR- or IEEE 802.11bn-compatible) devices for opportunistic access to spectrum that may be otherwise under-utilized.

Puncturing is a wireless communication technique that enables a wireless communication device (such as either an AP 102 or a STA 104) to transmit and receive wireless communications over a portion of a wireless channel exclusive of one or more particular subchannels (hereinafter also referred to as "punctured subchannels"). Puncturing specifically may be used to exclude one or more subchannels from the transmission of a PPDU, including the signaling of the preamble, to avoid interference from a static source, such as an incumbent system, or to avoid interference of a more dynamic nature such as that associated with transmissions by other wireless communication devices in overlapping BSSs (OBSSs). The transmitting device (such as an AP 102 or a STA 104) may puncture the subchannels on which there is interference and in essence spread the data of the PPDU to cover the remaining portion of the bandwidth of the channel. For example, if a transmitting device determines (such as detects, identifies, ascertains, or calculates), in association with a contention operation, that one or more 20 MHz subchannels of a wider bandwidth wireless channel are busy or otherwise not available, the transmitting device implement puncturing to avoid communicating over the unavailable subchannels while still utilizing the remaining portions of the bandwidth. Accordingly, puncturing enables a transmitting device to improve or maximize throughput, and in some instances reduce latency, by utilizing as much of the available spectrum as possible. Static puncturing in particular makes it possible to consistently use wideband channels in environments or deployments where there may be insufficient contiguous spectrum available, such as in the 5 GHz and 6 GHz bands.

In some examples, the AP 102 or the STAs 104 of the wireless communication network 100 may implement Extremely High Throughput (EHT) or other features compliant with current and future generations of the IEEE 802.11 family of wireless communication protocol standards (such as the IEEE 802.11be and 802.11bn standard amendments) to provide additional capabilities over other previous systems (such as High Efficiency (HE) systems or other legacy systems). For example, the IEEE 802.11be standard amendment introduced 320 MHz channels, which are twice as wide as those possible with the IEEE 802.11ax standard amendment. The AP 102 or the STAs 104 may use 320 MHz channels enabling double the throughput and network capacity, as well as providing rate versus range gains at high data rates due to linear bandwidth versus log SNR trade-off. EHT and newer wireless communication protocols (such as the protocols referred to as or associated with the IEEE 802.11bn standard amendment) may support flexible operating bandwidth enhancements, such as broadened operating bandwidths relative to legacy operating bandwidths or more granular operation relative to legacy operation. For example, an EHT system may allow communication spanning operating bandwidths of 20 MHz, 40 MHz, 80 MHz, 160 MHz, 240 MHz, and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples in which a wireless communication device (such as the AP 102 or the STA 104) operates in a contiguous 320 MHz bandwidth mode or a 160+160 MHz bandwidth mode, signals for transmission may be generated by two different transmit chains of the wireless communication device each having or associated with a bandwidth of 160 MHz (and each coupled to a different power amplifier). In some other examples, two transmit chains can be used to support a 240 MHz/160+80 MHz bandwidth mode by puncturing 320 MHz/160+160 MHz bandwidth modes with one or more 80 MHz subchannels. For example, signals for transmission may be generated by two different transmit chains of the wireless communication device each having a bandwidth of 160 MHz with one of the transmit chains outputting a signal having an 80 MHz subchannel punctured therein. In some other examples in which the wireless communication device may operate in a contiguous 240 MHz bandwidth mode, or a noncontiguous 160+80 MHz bandwidth mode, the signals for transmission may be generated by three different transmit chains of the wireless communication device, each having a bandwidth of 80 MHz. In some other examples, signals for transmission may be generated by four or more different transmit chains of the wireless communication device, each having a bandwidth of 80 MHz.

In noncontiguous examples, the operating bandwidth may span one or more disparate sub-channel sets. For example, the 320 MHz bandwidth may be contiguous and located in the same 6 GHz band or noncontiguous and located in different bands or regions within a band (such as partly in the 5 GHz band and partly in the 6 GHz band).

In some examples, the AP 102 or the STA 104 may benefit from operability enhancements associated with EHT and newer generations of the IEEE 802.11 family of wireless communication protocol standards. For example, the AP 102 or the STA 104 attempting to gain access to the wireless medium of the wireless communication network 100 may perform techniques (which may include modifications to existing rules, structure, or signaling implemented for legacy systems) such as clear channel assessment (CCA) operation based on EHT enhancements such as increased bandwidth, puncturing, or refinements to carrier sensing and signal reporting mechanisms.

In WLAN communication, an AP 102 may communicate with a STA 104 via a M-Primary channel and an O-Primary channel. The AP 102 and the STA 104 may communicate via the O-Primary channel if, for example, traffic associated with the M-Primary channel exceeds a threshold. In some examples, the AP 102 may switch the M-Primary channel from a first bandwidth to a second bandwidth. The AP 102 may indicate the channel switch via a CSA element. In some examples, the O-Primary channel may fall outside of a BSS bandwidth from the M-Primary channel, the AP 102 may switch the M-Primary channel and the O-Primary channel, or the AP may change the O-Primary channel for another reason.

Various aspects generally relate to methods for an AP to transmit a CSA element or an ECSA element that may announce an O-Primary channel switch. Various aspects relate more specifically to an expanded channel switch mode field of a CSA element or the ECSA element that may indicate whether the STA is permitted to transmit via the first O-Primary channel during the switch, whether a new operating class field is present in the CSA element or ECSA element, and an index associated with the O-Primary channel that the AP is switching. In some aspects, the CSA element or the ECSA element may be a separate information element, or an element defined within a NPCA wrapper. The AP may transmit the CSA element or the ECSA element via a beacon frame, a probe response frame, or a dedicated channel switch announcement frame.

Figure 2:
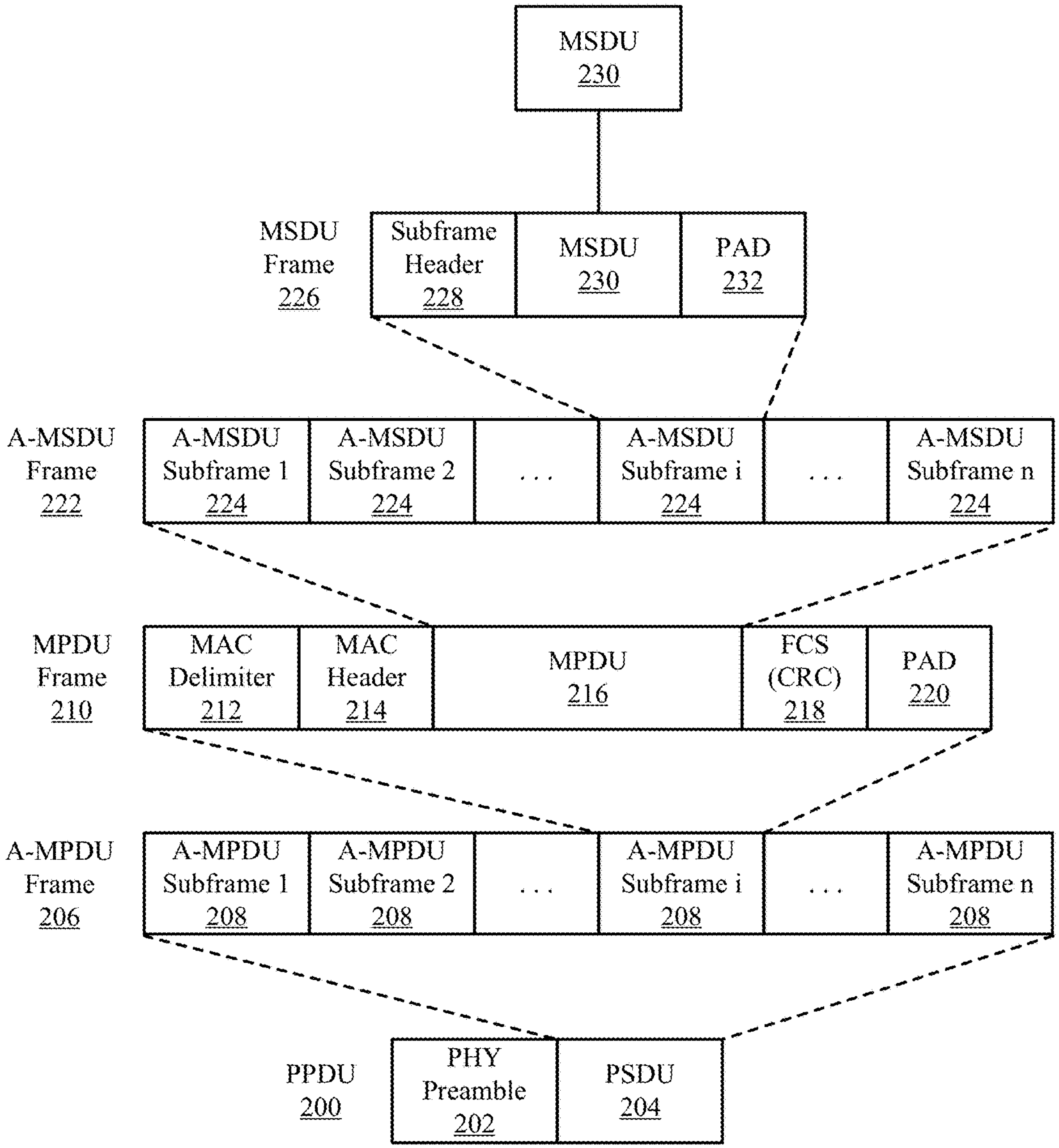
FIG. 2 shows a hierarchical format of an example PPDU usable for communication between a wireless AP and one or more wireless STAs.

FIG. 2 shows a hierarchical format of an example PPDU usable for communication between a wireless AP and one or more wireless STAs. For example, the AP and STAs may be examples of the AP 102 and the STAs 104 described with reference to FIG. 1. As described, each PPDU 200 includes a PHY preamble 202 and a PSDU 204. Each PSDU 204 may represent (or "carry") one or more MAC protocol data units (MPDUs) 216. For example, each PSDU 204 may carry an aggregated MPDU (A-MPDU) 206 that includes an aggregation of multiple A-MPDU subframes 208. Each A-MPDU subframe 208 may include an MPDU frame 210 that includes a MAC delimiter 212 and a MAC header 214 prior to the accompanying MPDU 216, which includes the data portion ("payload" or "frame body") of the MPDU frame 210. Each MPDU frame 210 also may include a frame check sequence (FCS) field 218 for error detection (such as the FCS field 218 may include a cyclic redundancy check (CRC)) and padding bits 220. The MPDU 216 may carry one or more MAC service data units (MSDUs) 230. For example, the MPDU 216 may carry an aggregated MSDU (A-MSDU) 222 including multiple A-MSDU subframes 224. Each A-MSDU subframe 224 may be associated with an MSDU frame 226 and may contain a corresponding MSDU 230 preceded by a subframe header 228 and, in some examples, followed by padding bits 232.

Referring back to the MPDU frame 210, the MAC delimiter 212 may serve as a marker of the start of the associated MPDU 216 and indicate the length of the associated MPDU 216. The MAC header 214 may include multiple fields containing information that defines or indicates characteristics or attributes of data encapsulated within the frame body. The MAC header 214 includes a duration field indicating a duration extending from the end of the PPDU until at least the end of an acknowledgement (ACK) or Block ACK (BA) of the PPDU that is to be transmitted by the receiving wireless communication device. The use of the duration field serves to reserve the wireless medium for the indicated duration and enables the receiving device to establish its network allocation vector (NAV). The MAC header 214 also includes one or more fields indicating addresses for the data encapsulated within the frame body. For example, the MAC header 214 may include a combination of a source address, a transmitter address, a receiver address or a destination address. The MAC header 214 may further include a frame control field containing control information. The frame control field may specify a frame type, for example, a data frame, a control frame, or a management frame.

In some wireless communication systems, wireless communication between an AP 102 and an associated STA 104 can be secured. For example, either an AP 102 or a STA 104 may establish a security key for securing wireless communication between itself and the other device and may encrypt the contents of the data and management frames using the security key. In some examples, the control frame and fields within the MAC header of the data or management frames, or both, also may be secured either via encryption or via an integrity check (such as by generating a message integrity check (MIC) for one or more relevant fields.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some examples, the wireless communication device (such as the AP 102 or the STA 104) may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (such as identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is compared to a threshold to determine (such as identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. In examples in which the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC_VI), background (AC_BK), and best effort (AC_BE). This enables particular types of traffic to be prioritized in the network.

In some other examples, the wireless communication device (such as the AP 102 or the STA 104) may contend for access to the wireless medium of a WLAN in accordance with an enhanced distributed channel access (EDCA) procedure. A random channel access mechanism such as EDCA may afford high-priority traffic a greater likelihood of gaining medium access than low-priority traffic. The wireless communication device using EDCA may classify data into different access categories. Each AC may be associated with a different priority level and may be assigned a different range of random backoffs (RBOs) so that higher priority data is more likely to win a TXOP than lower priority data (such as by assigning lower RBOs to higher priority data and assigning higher RBOs to lower priority data). Although EDCA increases the likelihood that low-latency data traffic will gain access to a shared wireless medium during a given contention period, unpredictable outcomes of medium access contention operations may prevent low-latency applications from achieving certain levels of throughput or satisfying certain latency requirements.

Some APs and STAs (such as the AP 102 and the STAs 104 described with reference to FIG. 1) may implement spatial reuse techniques. For example, APs 102 and STAs 104 configured for communication using the protocols defined in the IEEE 802.11ax or 802.11be standard amendments may be configured with a BSS color. APs 102 associated with different BSSs may be associated with different BSS colors. A BSS color is a numerical identifier of an AP 102's respective BSS (such as a 6 bit field carried by the SIG field). Each STA 104 may learn its own BSS color upon association with the respective AP 102. BSS color information is communicated at both the PHY and MAC sublayers. If an AP 102 or a STA 104 detects, obtains, selects, or identifies, a wireless packet from another wireless communication device while contending for access, the AP 102 or the STA 104 may apply different contention parameters in accordance with whether the wireless packet is transmitted by, or transmitted to, another wireless communication device (such another AP 102 or STA 104) within its BSS or from a wireless communication device from an overlapping BSS (OBSS), as determined, identified, ascertained, or calculated by a BSS color indication in a preamble of the wireless packet. For example, if the BSS color associated with the wireless packet is the same as the BSS color of the AP 102 or STA 104, the AP 102 or STA 104 may use a first RSSI detection threshold when performing a CCA on the wireless channel. However, if the BSS color associated with the wireless packet is different than the BSS color of the AP 102 or STA 104, the AP 102 or STA 104 may use a second RSSI detection threshold in lieu of using the first RSSI detection threshold when performing the CCA on the wireless channel, the second RSSI detection threshold being greater than the first RSSI detection threshold. In this way, the criteria for winning contention are relaxed in examples in which interfering transmissions are associated with an OBSS.

APs and STAs (such as the AP 102 and the STAs 104 described with reference to FIG. 1) that include multiple antennas may support various diversity schemes. For example, spatial diversity may be used by one or both of a transmitting device (such as an AP 102 or a STA 104) or a receiving device (such as an AP 102 or a STA 104) to increase the robustness of a transmission. For example, to implement a transmit diversity scheme, a transmitting device may transmit the same data redundantly over two or more antennas.

APs 102 and STAs 104 that include multiple antennas also may support space-time block coding (STBC). With STBC, a transmitting device also transmits multiple copies of a data stream across multiple antennas to exploit the various received versions of the data to increase the likelihood of decoding the correct data. More specifically, the data stream to be transmitted is encoded in blocks, which are distributed among the spaced antennas and across time. Generally, STBC can be used in examples in which the number $N_{Tx}$ of transmit antennas exceeds the number $N_{SS}$ of spatial streams. The $N_{SS}$ spatial streams may be mapped to a number $N_{STS}$ of space-time streams, which are mapped to $N_{Tx}$ transmit chains.

APs 102 and STAs 104 that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are separately encoded and transmitted in parallel via the multiple $N_{Tx}$ transmit antennas.

APs 102 and STAs 104 that include multiple antennas also may support beamforming. Beamforming generally refers to the steering of the energy of a transmission in the direction of a target receiver. Beamforming may be used both in a single-user (SU) context, for example, to improve a signal-to-noise ratio (SNR), as well as in a multi-user (MU) context, for example, to enable MU-MIMO transmissions (also referred to as spatial division multiple access (SDMA)). In the MU-MIMO context, beamforming may additionally, or alternatively, involve the nulling out of energy in the directions of other receiving devices. To perform SU beamforming or MU-MIMO, a transmitting device, referred to as the beamformer, transmits a signal from each of multiple antennas. The beamformer configures the amplitudes and phase shifts between the signals transmitted from the different antennas such that the signals add constructively along particular directions towards the intended receiver (referred to as the beamformee) or add destructively in other directions towards other devices to mitigate interference in a MU-MIMO context. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (such as in the form of a null data packet (NDP)) to the beamformee. An NDP is a PPDU without any data field. The beamformee may perform measurements for each of the $N_{Tx} \times N_{Rx}$ sub-channels corresponding to all of the transmit antenna and receive antenna pairs associated with the sounding signal. The beamformee generates a feedback matrix associated with the channel measurements and, typically, compresses the feedback matrix before transmitting the feedback to the beamformer. The beamformer may generate a precoding (or "steering") matrix for the beamformee associated with the feedback and use the steering matrix to precode the data streams to configure the amplitudes and phase shifts for subsequent transmissions to the beamformee. The beamformer may use the steering matrix to determine (such as identify, detect, ascertain, calculate, or compute) how to transmit a signal on each of its antennas to perform beamforming. For example, the steering matrix may be indicative of a phase shift, or a power level, to use to transmit a respective signal on each of the beamformer's antennas.

When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions or nulls by increasing the number of transmit antennas. This is especially advantageous in MU transmission contexts in which it is particularly important to reduce inter-user interference.

To increase an AP 102's spatial multiplexing capability, an AP 102 may need to support an increased number of spatial streams (such as up to 16 spatial streams). However, supporting additional spatial streams may result in increased CSI feedback overhead. Implicit CSI acquisition techniques may avoid CSI feedback overhead by taking advantage of the assumption that the UL and DL channels have reciprocal impulse responses (that is, that there is channel reciprocity). For example, the CSI feedback overhead may be reduced using an implicit channel sounding procedure such as an implicit beamforming report (BFR) technique (such as where STAs 104 transmit NDP sounding packets in the UL while the AP 102 measures the channel) because no BFRs are sent. Once the AP 102 receives the NDPs, it may implicitly assess the channels for each of the STAs 104 and use the channel assessments to configure steering matrices. In order to mitigate hardware mismatches that could break the channel reciprocity on the UL and DL (such as the baseband-to-RF and RF-to-baseband chains not being reciprocal), the AP 102 may implement a calibration method to compensate for the mismatch between the UL and the DL channels. For example, the AP 102 may select a reference antenna, transmit a pilot signal from each of its antennas, and estimate baseband-to-RF gain for each of the non-reference antennas relative to the reference antenna.

In some examples, multiple APs 102 may simultaneously transmit signaling or communication to a single STA 104 utilizing a distributed MU-MIMO scheme. Examples of such a distributed MU-MIMO transmission include coordinated beamforming (CBF) and joint transmission (JT). With CBF, signals (such as data streams) for a given STA 104 may be transmitted by only a single AP 102. However, the coverage areas of neighboring APs may overlap, and signals transmitted by a given AP 102 may reach the STAs in OBSSs associated with neighboring APs as OBSS signals. CBF allows multiple neighboring APs to transmit simultaneously while minimizing or avoiding interference, which may result in more opportunities for spatial reuse. More specifically, using CBF techniques, an AP 102 may beamform signals to in-BSS STAs 104 while forming nulls in the directions of STAs in OBSSs such that any signals received at an OBSS STA are of sufficiently low power to limit the interference at the STA. To accomplish this, an inter-BSS coordination set may be defined between the neighboring APs, which contains identifiers of all APs and STAs participating in CBF transmissions.

With JT, signals for a given STA 104 may be transmitted by multiple coordinated APs 102. For the multiple APs 102 to concurrently transmit data to a STA 104, the multiple APs 102 may all need a copy of the data to be transmitted to the STA 104. The APs 102 may need to exchange the data among each other for transmission to a STA 104. With JT, the combination of antennas of the multiple APs 102 transmitting to one or more STAs 104 may be considered as one large antenna array (which may be represented as a virtual antenna array) used for beamforming and transmitting signals. In combination with MU-MIMO techniques, the multiple antennas of the multiple APs 102 may be able to transmit data via multiple spatial streams. Each STA 104 may receive data via one or more of the multiple spatial streams.

Some APs and STAs, such as, for example, the AP 102 and STAs 104 described with reference to FIG. 1, are capable of multi-link operation (MLO). For example, the AP 102 and STAs 104 may support MLO as defined in one or both of the IEEE 802.11be and 802.11bn standard amendments. An MLO-capable device may be referred to as a multi-link device (MLD). In some examples, MLO supports establishing multiple different communication links (such as a first link on the 2.4 GHz band, a second link on the 5 GHz band, and the third link on the 6 GHz band) between MLDs. Each communication link may support one or more sets of channels or logical entities. For example, an AP MLD may set, for each of the communication links, a respective operating bandwidth, one or more respective primary channels, and various BSS configuration parameters. An MLD may include a single upper MAC entity, and can include, for example, three independent lower MAC entities and three associated independent PHY entities for respective links in the 2.4 GHz, 5 GHz, and 6 GHz bands. This architecture may enable a single association process and security context. An AP MLD may include multiple APs 102 each configured to communicate on a respective communication link with a respective one of multiple STAs 104 of a non-AP MLD (also referred to as a "STA MLD").

To support MLO techniques, an AP MLD and a STA MLD may exchange MLO capability information (such as supported aggregation types or supported frequency bands, among other information). In some examples, the exchange of information may occur via a beacon frame, a probe request frame, a probe response frame, an association request frame, an association response frame, another management frame, a dedicated action frame, or an operating mode indicator (OMI), among other examples. In some examples, an AP MLD may designate a specific channel of one link in one of the bands as an anchor channel on which it transmits beacons and other control or management frames periodically. In such examples, the AP MLD also may transmit shorter beacons (such as ones which may contain less information) on other links for discovery or other purposes.

MLDs may exchange packets on one or more of the communication links dynamically and, in some instances, concurrently. MLDs also may independently contend for access on each of the communication links, which achieves latency reduction by enabling the MLD to transmit its packets on the first communication link that becomes available. For example, "alternating multi-link" may refer to an MLO mode in which an MLD may listen on two or more different high-performance links and associated channels concurrently. In an alternating multi-link mode of operation, an MLD may alternate between use of two links to transmit portions of its traffic. Specifically, an MLD with buffered traffic may use the first link on which it wins contention and obtains a TXOP to transmit the traffic. While such an MLD may in some examples be capable of transmitting or receiving on only one communication link at any given time, having access opportunities via two different links enables the MLD to avoid congestion, reduce latency, and maintain throughput.

Multi-link aggregation (MLA) (which also may be referred to as carrier aggregation (CA)) is another MLO mode in which an MLD may simultaneously transmit or receive traffic to or from another MLD via multiple communication links in parallel such that utilization of available resources may be increased to achieve higher throughput. That is, during at least some duration of time, transmissions or portions of transmissions may occur over two or more communication links in parallel at the same time. In some examples, the parallel communication links may support synchronized transmissions. In some other examples, or during some other durations of time, transmissions over the communication links may be parallel, but not be synchronized or concurrent. Additionally, in some examples or durations of time, two or more of the communication links may be used for communication between MLDs in the same direction (such as all uplink or all downlink), while in some other examples or durations of time, two or more of the communication links may be used for communication in different directions (such as one or more communication links may support uplink communication and one or more communication links may support downlink communication). In such examples, at least one of the MLDs may operate in a full duplex mode.

MLA may be packet-based or flow-based. For packet-based aggregation, frames of a single traffic flow (such as all traffic associated with a given traffic identifier (TID)) may be transmitted concurrently across multiple communication links. For flow-based aggregation, each traffic flow (such as all traffic associated with a given TID) may be transmitted using a single respective one of multiple communication links. As an example, a single STA MLD may access a web browser while streaming a video in parallel. Per the above example, the traffic associated with the web browser access may be communicated over a first communication link while the traffic associated with the video stream may be communicated over a second communication link in parallel (such that at least some of the data may be transmitted on the first channel concurrently with data transmitted on the second channel). In some other examples, MLA may be implemented with a hybrid of flow-based and packet-based aggregation. For example, an MLD may employ flow-based aggregation in situations in which multiple traffic flows are created and may employ packet-based aggregation in other situations. Switching among the MLA techniques or modes may additionally, or alternatively, be associated with other metrics (such as a time of day, traffic load within the network, or battery power for a wireless communication device, among other factors or considerations).

Other MLO techniques may be associated with traffic steering and QoS characterization, which may achieve latency reduction and other QoS enhancements by mapping traffic flows having different latency or other requirements to different links. For example, traffic with low latency requirements may be mapped to communication links operating in the 6 GHz band and more latency-tolerant flows may be mapped to communication links operating in the 2.4 GHz or 5 GHz bands. Such an operation, referred to as TID-to-Link mapping (TTLM), may enable two MLDs to negotiate mapping of certain traffic flows in the DL direction or the UL direction or both directions to one or more set of communication links set up between them. In some examples, an AP MLD may advertise a global TTLM that applies to all associated non-AP MLDs. A communication link that has no TIDs mapped to it in either direction is referred to as a disabled link. An enabled link has at least one TID mapped to it in at least one direction.

In some examples, an MLD may include multiple radios and each communication link associated with the MLD may be associated with a respective radio of the MLD. Each radio may include one or more of its own transmit/receive (Tx/Rx) chains, include or be coupled with one or more of its own physical antennas or shared antennas, and include signal processing components, among other components. An MLD with multiple radios that may be used concurrently for MLO may be referred to as a multi-link multi-radio (MLMR) MLD. Some MLMR MLDs may further be capable of an enhanced MLMR (eMLMR) mode of operation, in which the MLD may be capable of dynamically switching radio resources (such as antennas or RF frontends) between multiple communication links (such as switching from using radio resources for one communication link to using the radio resources for another communication link) to enable higher transmission and reception using higher capacity on a given communication link. In this eMLMR mode of operation, MLDs may be able to move Tx/Rx radio resources from one communication link to another link, increasing the spatial stream capability of the other communication link. For example, if a non-AP MLD includes four or more STAs, the STAs associated with the eMLMR links may "pool" their antennas so that each of the STAs can utilize the antennas of other STAs when transmitting or receiving on one of the eMLMR links.

Other MLDs may have more limited capabilities and not include multiple radios. An MLD with only a single radio that is shared for multiple communication links may be referred to as a multi-link single radio (MLSR) MLD. Control frames may be exchanged between MLDs before initiating data or management frame exchanges between the MLDs in cases in which at least one of the MLDs is operating as an MLSR MLD. Because an MLD operating in the MLSR mode is limited to a single radio, it cannot use multiple communication links simultaneously and may instead listen to (such as monitor), transmit or receive on only a single communication link at any given time. An MLSR MLD may instead switch between different bands in a TDM manner. In contrast, some MLSR MLDs may further be capable of an enhanced MLSR (eMLSR) mode of operation, in which the MLD can concurrently listen on multiple links for specific types of packets, such as buffer status report poll (BSRP) frames or multi-user (MU) request-to-send (RTS) (MU-RTS) frames. Although an MLD operating in the eMLSR mode can still transmit or receive on only one of the links at any given time, it may be able to dynamically switch between bands, resulting in improvements in both latency and throughput. For example, in examples in which the STAs of a non-AP MLD may detect a BSRP frame on their respective communication links, the non-AP MLD may tune all of its antennas to the communication link on which the BSRP frame is detected. By contrast, a non-AP MLD operating in the MLSR mode can only listen to, and transmit or receive on, one communication link at any given time.

An MLD that is capable of simultaneous transmission and reception on multiple communication links may be referred to as a simultaneous transmission and reception (STR) device. In a STR-capable MLD, a radio associated with a communication link can independently transmit or receive frames on that communication link without interfering with, or without being interfered with by, the operation of another radio associated with another communication link of the MLD. For example, an MLD with a suitable filter may simultaneously transmit on a 2.4 GHz band and receive on a 5 GHz band, or vice versa, or simultaneously transmit on the 5 GHz band and receive on the 6 GHz band, or vice versa, and as such, be considered a STR device for the respective paired communication links. Such an STR-capable MLD may generally be an AP MLD or a higher-end STA MLD having a higher performance filter. An MLD that is not capable of simultaneous transmission and reception on multiple communication links may be referred to as a non-STR (NSTR) device. A radio associated with a given communication link in an NSTR device may experience interference in examples in which there is a transmission on another communication link of the NSTR device. For example, an MLD with a standard filter may not be able to simultaneously transmit on a 5 GHz band and receive on a 6 GHz band, or vice versa, and as such, may be considered a NSTR device for those two communication links.

In some wireless communication systems, an MLD may include multiple non-collocated entities. For example, an AP MLD may include non-collocated AP devices and a STA MLD may include non-collocated STA devices. In examples in which an AP MLD includes multiple non-collocated AP devices, a single mobility domain (SMD) entity may refer to a logical entity that controls the associated non-collocated APs. A non-AP STA (such as a non-MLD non-AP STA or a non-AP MLD that includes one or more associated non-AP STAs) may associate with the SMD entity via one of its constituent APs and may seamlessly roam (such as without requiring reassociation) between the APs associated with the SMD entity. The SMD entity also may maintain other context (such as security and Block ACK) for non-AP STAs associated with it.

The afore-mentioned and related MLO techniques may provide multiple benefits to a wireless communication network 100. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the "on" time of a modem, which may benefit a wireless communication device in terms of power consumption. Another benefit of MLO is the increased multiplexing opportunities in the case of a single BSS. For example, MLA may increase the number of users per multiplexed transmission served by the multi-link AP MLD.

In some environments, locations, or conditions, a regulatory body may impose a power spectral density (PSD) limit for one or more communication channels or for an entire band (such as the 6 GHz band). A PSD is a measure of transmit power as a function of a unit bandwidth (such as per 1 MHz). The total transmit power of a transmission is consequently the product of the PSD and the total bandwidth by which the transmission is sent. Unlike the 2.4 GHz and 5 GHz bands, the United States Federal Communication Commission (FCC) has established PSD limits for low power devices when operating in the 6 GHz band. The FCC has defined three power classes for operation in the 6 GHz band: standard power, low power indoor, and very low power. Some APs 102 and STAs 104 that operate in the 6 GHz band may conform to the low power indoor (LPI) power class, which limits the transmit power of APs 102 and STAs 104 to 5 decibel-milliwatts per megahertz (dBm/MHz) and −1 dBm/MHz, respectively. In other words, transmit power in the 6 GHz band is PSD-limited on a per-MHz basis.

Such PSD limits can undesirably reduce transmission ranges, reduce packet detection capabilities, and reduce channel estimation capabilities of APs 102 and STAs 104. In some examples in which transmissions are subject to a PSD limit, the AP 102 or the STAs 104 of a wireless communication network 100 may transmit over a greater transmission bandwidth to allow for an increase in the total transmit power, which may increase an SNR and extend coverage of the wireless communication devices. For example, to overcome or extend the PSD limit and improve SNR for low power devices operating in PSD-limited bands, 802.11be introduced a duplicate (DUP) mode for a transmission, by which data in a payload portion of a PPDU is modulated for transmission over a "base" frequency sub-band, such as a first RU of an OFDMA transmission, and copied over (such as duplicated) to another frequency sub-band, such as a second RU of the OFDMA transmission. In DUP mode, two copies of the data are to be transmitted, and, for each of the duplicate RUs, using dual carrier modulation (DCM), which also has the effect of copying the data such that two copies of the data are carried by each of the duplicate RUs, so that, for example, four copies of the data are transmitted. While the data rate for transmission of each copy of the user data using the DUP mode may be the same as a data rate for a transmission using a "normal" mode, the transmit power for the transmission using the DUP mode may be essentially multiplied by the number of copies of the data being transmitted, at the expense of requiring an increased bandwidth. As such, using the DUP mode may extend range but reduce spectrum efficiency.

In some other examples in which transmissions are subject to a PSD limit, a distributed tone mapping operation may be used to increase the bandwidth via which a STA 104 transmits an uplink communication to the AP 102. As used herein, the term "distributed transmission" refers to a PPDU transmission on noncontiguous tones (or subcarriers) of a wireless channel. In contrast, the term "contiguous transmission" refers to a PPDU transmission on contiguous tones. As used herein, a logical RU represents a number of tones or subcarriers that are allocated to a given STA 104 for transmission of a PPDU. As used herein, the term "regular RU" (or rRU) refers to any RU or MRU tone plan that is not distributed, such as a configuration supported by 802.11be or earlier versions of the IEEE 802.11 family of wireless communication protocol standards. As used herein, the term "distributed RU" (or dRU) refers to the tones distributed across a set of noncontiguous subcarrier indices to which a logical RU is mapped. The term "distributed tone plan" refers to the set of noncontiguous subcarrier indices associated with a dRU. The channel or portion of a channel within which the distributed tones are interspersed is referred to as a spreading bandwidth, which may be, for example, 40 MHz, 80 MHz or more. The use of dRUs may be limited to uplink communication because benefits to addressing PSD limits may only be present for uplink communication.

Figure 3:
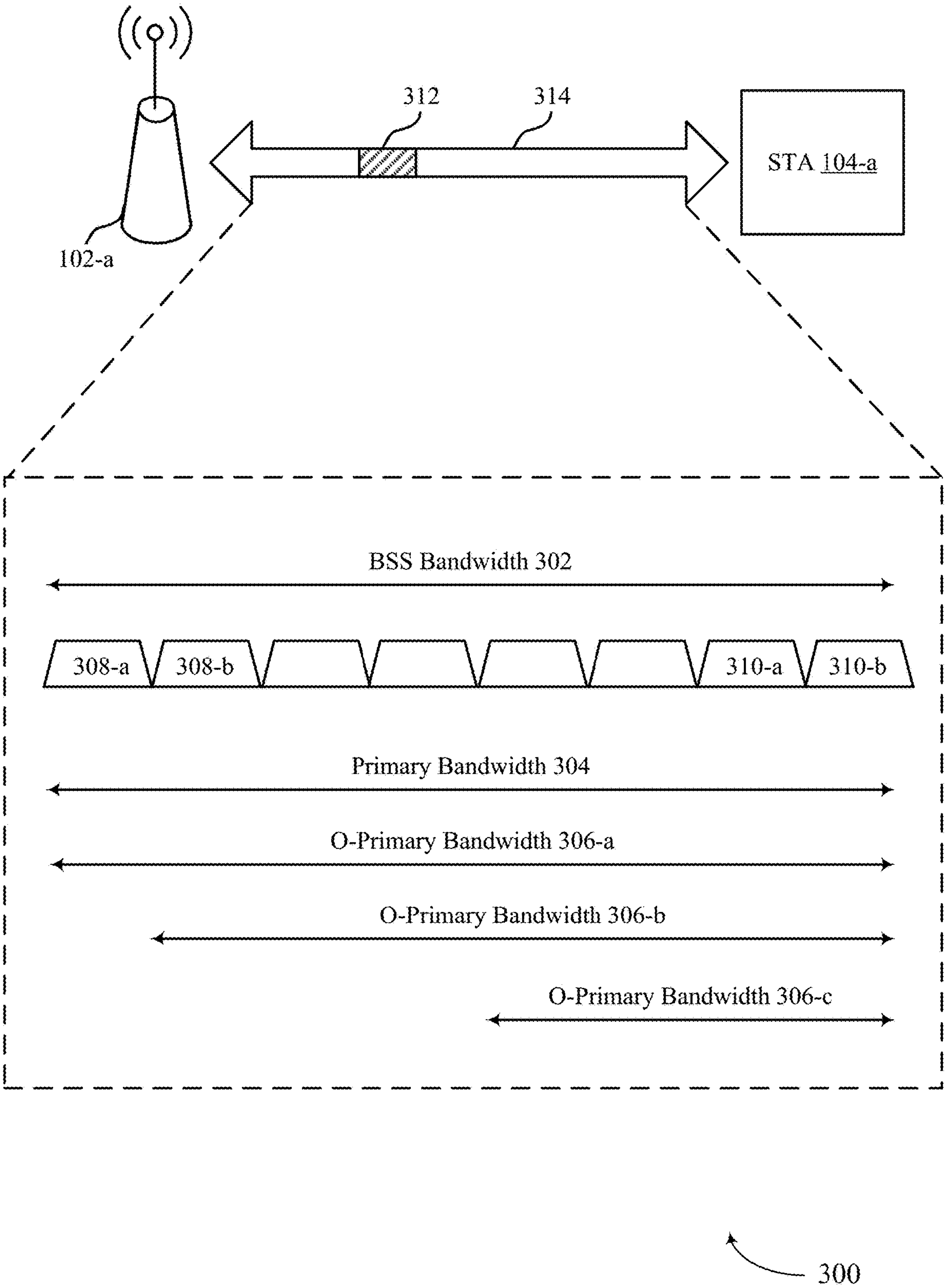
FIG. 3 shows an example of a signaling diagram that supports announcing opportunistic primary (O-Primary) channel switching.

FIG. 3 shows an example of a signaling diagram 300 that supports announcing O-Primary channel switching. The signaling diagram 300 may implement or may be implemented by aspects of the wireless communication network 100 or the PPDU 200. For example, the signaling diagram 300 may be implemented by an AP 102 (such as an AP 102-*a*) or an STA 104 (such as an STA 104-*a*), which may be examples of the corresponding devices as described with reference to FIG. 1.

In some wireless communication networks, an AP 102-*a* may establish a wireless communication link 314 between the AP 102-*a* and an STA 104-*a*. The AP 102-*a* may accordingly communicate with the STA 104-*a* via a BSS bandwidth 302, which may be an example of an up to 320 MHz bandwidth. The BSS bandwidth 302 may include one or more bandwidths (such as a primary bandwidth 304) over which the STA 104-*a* may transmit signaling to the AP 102-*a*.

The primary bandwidth 304 may include one or more subchannels associated with the wireless communication link 314, such as one or more 20 MHz subchannels, over which the AP 102-*a* may transmit communication to the STA 104-*a*. For example, the AP 102-*a* may contend for access of a primary channel such as an M-Primary channel 308-*a*. In some examples, for the AP 102-*a* to access a larger bandwidth of the BSS bandwidth 302, the AP 102-*a* may contend for access to the M-Primary channel 308-*a*. In examples in which an OBSS STA occupies the M-Primary channel 308-*a*, such contention-based access may result in relatively less use of one or more other subchannels of the BSS bandwidth 302 (one or more secondary subchannels, such as a secondary subchannel 308-*b* or a secondary subchannel 310-*b*). The unused subchannels may result in lower throughput and longer latency as compared to a wireless network in which the AP 102-*a* may transmit on a relatively larger portion of the BSS bandwidth 302.

The STA 104-*a* may be capable of monitoring one or more additional primary channels of the wireless communication link 314, such as one or more 20 MHz primary channels, within the BSS bandwidth 302, such as an O-Primary channel 310-*a*. The AP 102-*a* may access and transmit over the O-Primary channel 310-*a* in examples in which traffic associated with the M-Primary channel 308-*a* is higher than traffic associated with the O-Primary channel 310-*a*. The O-Primary channel 310-*a* may be within an O-Primary bandwidth 306, which may be a bandwidth over which the STA 104-*a* may transmit signal to the AP 102-*a* when the STA 104-*a* contends on the O-Primary channel 310-*a*. In some examples, the O-Primary bandwidth 306 may be a same bandwidth as the primary bandwidth 304, as illustrated with reference to an O-Primary bandwidth 306-*a*. In some examples, the O-Primary bandwidth 306 may include a portion of the BSS bandwidth 302 excepting 20 MHz of the M-Primary channel 308-*a*, as illustrated with reference to an O-Primary bandwidth 306-*b*. In some examples, the O-Primary bandwidth may be a subset of the BSS bandwidth 302 and may have a bandwidth of the form $BW_O=20*2^i$ in which i may be an integer, as illustrated with reference to the O-Primary bandwidth 306-*c*. The O-Primary bandwidth 306 may be contiguous or non-contiguous. For example, the O-Primary bandwidth may include one or more gaps, such as a gap to exclude the M-Primary channel 308-*a*, or may be a longest contiguous bandwidth of the BSS bandwidth 302 excluding the M-Primary channel 308-*a*.

In some examples, the STA 104-*a* may transmit over an O-Primary bandwidth 306 with one or more other sizes or configurations not illustrated with reference to FIG. 3. That is, the example O-Primary bandwidths 306 illustrated with reference to FIG. 3 may be a non-exhaustive set of example O-Primary bandwidths 306. In some examples, the STA 104-*a* may monitor one or more additional O-Primary channels 310 and transmit via one or more additional O-Primary bandwidths 306.

In some examples, the STA 104-*a* may monitor the M-Primary channel 308-*a* and the O-Primary channel 310-*a* sequentially or in parallel. In examples in which the STA 104-*a* has a single radio, the STA 104-*a* may monitor the M-Primary channel 308-*a* until the STA 104-*a* detects OBSS on the M-Primary channel 308-*a*. In examples in which the STA 104-*a* detects OBSS, the STA 104-*a* may switch the single radio to monitor and contend for access of the O-Primary channel 310-*a*. In such examples, the STA 104-*a* may be a type-2 device.

In examples in which the STA 104-*a* has a main radio and additional components or capabilities, such as hardware, to monitor the O-Primary channel 310-*a*, the STA 104-*a* may monitor both of the M-Primary channel 308-*a* and the O-Primary channel 310-*a*. The additional hardware may include a second full radio, an auxiliary (AUX) radio, a short training field (STF) detector, or an energy detector. An AUX radio may be a radio used by a type-0 device capable of detecting preambles and decoding non-high throughput (HT) PPDUs. An STF detector may be a detector used by a type-1 device capable of detecting a legacy STF (L-STF) of PPDUs. The STF detector may not decode PPDUs. An energy detector may be a detector used by a type-2+ device capable of measuring energy. The energy detector may not detect or decode messages.

In some aspects, the AP 102-*a* may change a location of the M-Primary channel 308-*a*, the O-Primary channel 310-*a*, and/or one or more additional O-Primary channels 310. For example, the AP 102-*a* may perform a baseline channel switch announcement procedure to switch the M-Primary channel 308-*a* to a different 20 MHz channel. In such examples, the BSS bandwidth 302 may move to accommodate the new M-Primary channel, and the O-Primary channel 310-*a* may not fall within the new BSS bandwidth 302. The AP 102-*a* may move the O-Primary channel 310-*a* to fall within the new BSS bandwidth 302.

In some examples, the AP 102-*a* may determine to switch the O-Primary channel 310-*a* in examples in which the AP 102-*a* detects a new OBSS within the BSS bandwidth 302. The AP 102-*a* may select the M-Primary channel 308-*a* and the O-Primary channel 310-*a* using one or more criteria when the AP 102-*a* boots up. For example, the AP 102-*a* may detect an OBSS AP 102 operating within the BSS bandwidth 302, and may determine to overlap the M-Primary channel 308-*a* with a primary channel of the OBSS AP and to select a bandwidth outside of the primary channel of the OBSS AP 102 in the remainder of the BSS bandwidth 302 for the O-Primary channel 310-*a*. In examples in which the AP 102-*a* detects that a new OBSS AP 102 boots up in a vicinity of the AP 102-*a* and selects a primary channel within the BSS bandwidth 302 but different than the M-Primary channel 308-*a*, the AP 102-*a* may move the O-Primary channel 310-*a* to overlap with the primary channel of the new OBSS AP 102.

In some examples, the AP 102-*a* may determine to swap the M-Primary channel 308-*a* and the O-Primary channel 310-*a*. In examples in which the AP 102-*a* boots up, the AP 102-*a* may detect multiple OBSS APs 102 operating within the BSS bandwidth 302. The AP 102-*a* may determine to use an M-Primary channel 308-*a* that overlaps with a less busy portion of the BSS bandwidth 302 and an O-Primary channel 310-*a* that overlaps with a busier portion of the BSS bandwidth 302. The AP 102-*a* may determine to swap the M-Primary channel 308-*a* and the O-Primary channel 310-*a* in examples in which network conditions change such that the O-Primary channel 310-*a* is within a less busy portion of the BSS bandwidth 302 and the M-Primary channel 308-*a* is within a busier portion of the BSS bandwidth 302.

In examples in which the AP 102-*a* determines to perform a channel switch of the M-Primary channel 308-*a*, the AP 102-*a* may transmit a CSA element or an ECSA element to the STA 104-*a* indicating a channel number of a new channel. The ECSA element may include a new operating class field indicating an operating class of the new channel. The operating class may represent a set of channels in a specific regulatory domain. A channel number and operating class may together define a center frequency associated with a channel. The AP 102-*a* may transmit the CSA element in examples in which an operating class of the new M-Primary channel 308 is a same operating class as an operating class of the initial M-Primary channel 308-*a*, or the ECSA element in examples in which the operating class of the new M-Primary channel 308 is different than the operating class of the initial M-Primary channel 308-*a*.

In some examples, the AP 102-*a* may include the CSA element or the ECSA element in a beacon frame, a probe response frame, or another frame such as a dedicated CSA frame in examples in which a channel switch is imminent. For example, the AP 102-*a* may transmit the CSA element or the ECSA element in advance of the channel switch procedure such that STAs 104 in a power saving mode may receive at least one frame carrying the CSA element or the ECSA element. The AP 102-*a* may indicate an amount of time left before the channel switch procedure takes effect in a channel switch count field of the CSA element or the ECSA element. The AP 102-*a* may use a critical update framework to increase a likelihood that the STA 104-*a* will receive the CSA element or the ECSA element. For example, the AP 102-*a* may toggle a critical update flag and adjust or increment a BSS parameter change counter to indicate that the wireless communication link 314 between the AP 102-*a* and the STA 104-*a* has experienced an update. In some examples, the AP 102-*a* may transmit the CSA frame or the ECSA frame without performing contention in an IFS or a point coordination function (PCF) IFS (PIFS).

In some aspects, to advertise a channel switch operation or procedure for the O-Primary channel 310-*a* and/or one or more additional O-Primary channels 310, the AP 102-*a* may transmit a modified CSA element 312 (such as to indicate CSA as well as ECSA). The modified CSA element 312 may include one or more fields included in the CSA element and/or the ECSA element. The AP 102-*a* may transmit the modified CSA element 312 with one or more fields indicating indexes of the O-Primary channels 310 that the AP 102-*a* is switching, one or more fields indicating whether the element includes a field indicating a new operating class, and/or a field indicating whether the STA 104-*a* may transmit via the one or more O-Primary channels 310 during the channel switch procedure. The AP 102-*a* may transmit the modified CSA element 312 as an element with an element ID value different than an element ID value of the CSA element and/or the ECSA element, or as a subelement in a wrapper element (such as a NPCA wrapper) with an element ID extension value. The modified CSA element 312 is described in further detail with reference to FIG. 4.

The AP 102-*a* may transmit the modified CSA element 312 via a beacon frame, a probe response frame, an extended beacon frame, or another frame (such as a frame dedicated for CSA) during one or more durations in examples in which a channel switch operation of the O-Primary channel 310-*a* is imminent. For example, a channel switch count field of the modified CSA element 312 may indicate a quantity of beacon intervals that are pending before the AP 102-*a* performs the O-Primary channel switch (or before the channel switch takes effect). The AP 102-*a* may transmit the modified CSA element 312 in frames advance of the channel switch operations such that the STA 104-*a* may receive at least one frame carrying the modified CSA element 312 prior to when the channel switch takes effect in examples in which the STA 104-*a* is in a power saving mode. The AP 102-*a* may include a maximum channel switch time element (such as within or separate from an NPCA wrapper element) in a frame carrying a corresponding modified CSA element 312 that indicates an estimated time (or a maximum estimated time) before the AP 102-*a* may complete the channel switch operation. For example, the maximum channel switch time element may indicate a time in a quantity of TBTTs or beacon intervals from a time at which the AP 102-*a* transmits the frame carrying the corresponding modified CSA element 412 to a time at which the AP 102-*a* may complete channel switch operation (and begin transmitting via a new O-Primary channel).

In some examples, the AP 102-*a* may transmit the modified CSA element to indicate an update to a puncturing pattern associated with the O-Primary channel. In such examples, a new channel number (such as a channel number indicated via the new channel number field of the modified CSA element) may be a same channel number as a current channel number associated with the O-Primary channel. In some examples, the AP 102-*a* may indicate the update to the puncturing pattern via a channel switch wrapper element corresponding to the modified CSA element.

In some examples, the AP 102-*a* may transmit a BSS parameter change count subfield via the frame carrying the modified CSA element 312. The AP 102-*a* may adjust (or increment by 1) a value of the BSS parameter change count subfield in examples in which the AP 102-*a* announces the channel switch (such as by transmitting the modified CSA element 312). The AP 102-*a* may include a critical update flag in a capabilities information field of the frame (such as the beacon frame, the probe response frame, or the CSA-dedicated frame). The AP 102-*a* may set a value of the critical update flag to 1 in examples in which the AP 102-*a* announces the channel switch (such as by transmitting the modified CSA element 312). The STA 104-*a* (such as a STA 104 in a power saving mode) may identify that the AP 102-*a* and/or the wireless communication link 314 between the AP 102-*a* and the STA 104-*a* has experienced an update. In examples in which the AP 102-*a* is affiliated with an AP MLD, the AP MLD may adjust a value of a BSS parameter change count field on all affiliated wireless communication links corresponding to the affected APs 102 (such as one or more APs 102 that are performing a channel switch operation).

In some examples, the STA 104-*a* may determine to perform the channel switch in accordance with the information indicated via the modified CSA element 312. In some examples, the STA 104-*a* may not perform the channel switch in accordance with the information indicated via the modified CSA element 312 (such as by selecting an O-Primary channel different from an O-Primary channel indicated via the modified CSA element 312 or by not performing a channel switch). As an illustrative example, if the AP 102-*a* operates on a 320 MHz bandwidth and the STA 104-*a* operates on a 160 MHz bandwidth, the AP 102-*a* may perform an O-Primary channel switch to move an O-Primary channel from within the 160 MHz bandwidth of the STA 104-*a* to a bandwidth outside of the 160 MHz bandwidth of the STA 104-*a*. In such example, the STA 104-*a* may determine that NPCA may be inefficient (such as due to monitoring a channel outside of the 160 MHz bandwidth of the STA 104-*a*), and the STA 104-*a* may accordingly refrain from performing the channel switch. The STA 104-*a* may disable an NPCA mode or may select a different O-Primary channel to monitor (such as an O-Primary channel that is within the 160 MHz bandwidth of the STA 104-*a*).

Figure 4:
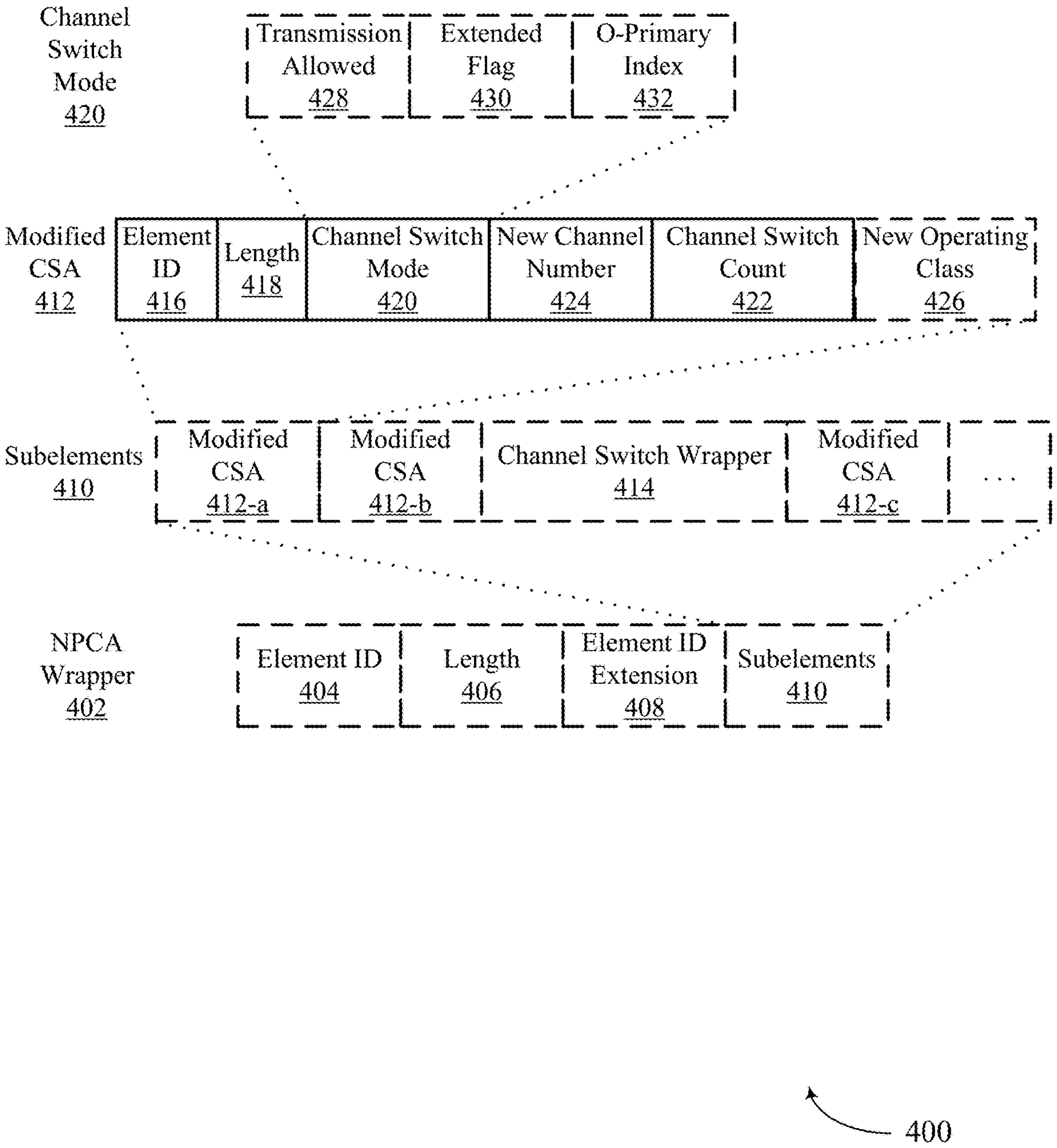
FIG. 4 shows an example of a frame structure that supports announcing O-Primary channel switching.

FIG. 4 shows an example of a frame structure 400 that supports announcing O-Primary channel switching. The frame structure 400 may implement or may be implemented by aspects of the wireless communication network 100, the PPDU 200, or the signaling diagram 300. For example, the frame structure 400 may be implemented by an AP 102 or an STA 104, which may be examples of the corresponding devices as described with reference to FIG. 1. The frame structure 400 may include an example of a modified CSA element 412 as described with reference to FIG. 3.

In some examples, as described with reference to FIG. 3, an AP 102 may transmit a modified CSA element 412 to a STA 104 to announce or advertise a channel switch procedure to switch an O-Primary channel from an initial O-Primary channel to a new O-Primary channel. The modified CSA element 412 may include an element ID field 416 indicating an ID of the modified CSA element 412, a length field 418 indicating a length of the modified CSA element 412, a channel switch mode field 420, a channel switch count field 422 indicating a time (such as a quantity of TBTTs or beacon intervals) from a transmission time or TBTT of a frame carrying the modified CSA element 412 to a time of the channel switch procedure, a new channel number field 424 indicating a channel number of a new channel (such as the new O-Primary channel) and/or a new operating class field 426 indicating a new operating class of the new O-Primary channel. The new operating class field 426 may be of varying length (such as a length of 0 or a length of 1). The new operating class field may be a last field of the modified CSA element 412.

In some examples, the AP 102 may divide the channel switch mode field 420 to include one or more fields (such as to include up to 255 values). For example, the channel switch mode field 420 may include a transmission allowed field 428 with a single bit that may indicate whether a non-AP STA (such as the STA 104) is permitted to transmit on the initial O-Primary channel while the AP 102 advertises the CSA. In examples in which the transmission allowed field 428 indicates a value of 0, the STA 104 may be enabled (or permitted) to transmit on the initial O-Primary channel for a duration from a time at which the STA 104 receives the modified CSA element 412 to a time of the channel switch procedure. In examples in which the transmission allowed field 428 indicates a value of 1, the STA 104 may not be enabled (or permitted) to transmit on the initial O-Primary channel for the duration. The transmission allowed field 428 may include one bit.

The channel switch mode field 420 may include an extended flag field 430. The extended flag field 430 may indicate whether the modified CSA element 412 includes the new operating class field 426 (which may be a frequency band-specific value). In examples in which the new O-Primary channel is in a different frequency band (such as a 6 gigahertz (GHz) band, a 5 GHz band, a lower 5 GHz band, and/or an upper 5 GHz band) than the initial O-Primary channel, the AP 102 may include the new operating class field 426 in the modified CSA element 412, and the modified CSA element may correspond to an ECSA element. In such examples, the extended flag field may indicate a value of 1 (to indicate that the new O-Primary channel has a different operating class from the initial O-Primary channel). In examples in which the new O-Primary channel is in a same frequency band as the initial O-Primary channel, the AP 102 may not include the new operating class field 426 in the modified CSA element 412, and the modified CSA element may correspond to a CSA element. In such examples, the extended flag field may indicate a value of 0 (to indicate that the new O-Primary channel has a same operating class as the initial O-Primary channel). The operating class associated with the frequency band (such as an operating class indicated by the new operating class field 426) and the channel number indicated by the new channel number field 424 may together indicate a center frequency of the new O-Primary channel. The extended flag field 430 may include one bit.

In some examples, there may not be an explicit indication of the new operating class for the O-Primary channel. In such examples, the new operating class may be implicitly derived by the non-AP STA. For example, if the AP transmits an indication of the channel switch of the O-Primary channel (such as the modified CSA element 412) along with an indication of a channel switch of the M-Primary channel (such as an ECSA element), the STA and the AP may use a new operating class indicated via the new operating class field of the ECSA element for the channel switch of the O-Primary channel. In some examples, if the AP does not transmit an indication of the channel switch of the M-Primary channel along with the indication of the channel switch of the O-Primary channel, the STA and the AP may not switch the operating class associated with the O-Primary channel when performing the O-Primary channel switch operation. In such examples, the modified CSA element 412 may not include the new operating class field 426 or the extended flag field 430.

In some aspects, the channel switch mode field 420 may include an O-Primary index field 432 that may indicate an index of the O-Primary channel that the AP 102 is switching. In examples in which the AP 102 communicates with the STA 104 via more than one O-Primary channel, the AP 102 may determine to switch a first O-Primary channel (such as the initial O-Primary channel) and to not switch a second O-Primary channel. In such examples, the AP 102 may indicate an index of the first O-Primary channel in the O-Primary index field 432. The AP 102 (and/or the STA 104) may compute the index as a frequency location of 20 MHz comprising the initial O-Primary channel within a 320 MHz BSS bandwidth minus 1. For example, the O-Primary index field 432 may indicate a value of 0 for an initial O-Primary channel in a lowest 20 MHz channel of the BSS bandwidth or a value of 15 for an initial O-Primary channel in a highest 20 MHz channel of the BSS bandwidth. The O-Primary index field 432 may include six bits.

In some aspects, the AP 102 may transmit one modified CSA element 412 or multiple modified CSA elements 412 to the STA. In examples in which the AP 102 determines to switch three O-Primary channels, the AP 102 may transmit a modified CSA element 412-*a*, a modified CSA element 412-*b*, and a modified CSA element 412-*c*, each corresponding to a respective O-Primary channel. That is, the modified CSA element 412-*a* may include an O-Primary index field indicating an index of a first O-Primary channel of the three O-Primary channels, the modified CSA element 412-*b* may include an O-Primary index field 432 indicating an index of a second O-Primary channel of the three O-Primary channels, and the modified CSA element 412-*c* may include an O-Primary index field 432 indicating an index of a third O-Primary channel of the three O-Primary channels. The AP 102 may transmit more or less than three modified CSA elements 412 (such as a quantity of CSA elements 412 corresponding to a quantity of O-Primary channels that the AP 102 may switch).

In some aspects, the AP 102 may transmit an extension of a corresponding modified CSA element 412 (such as the modified CSA element 412-*b*, as illustrated with reference to FIG. 4) in a channel switch wrapper element 414 (such as in a field following the corresponding modified CSA element 412). The channel switch wrapper element 414 may include a wideband CSA element, a transmit power envelope (TPE) element, and/or a new country element for a new O-Primary channel indicated by the corresponding modified CSA element 412. Additionally, or alternatively, the channel switch wrapper element 414 may include one or more fields indicating a puncturing pattern associated with an O-Primary channel indicated by the corresponding modified CSA element 412. In some examples, the AP may indicate a new puncturing pattern via the channel switch wrapper element 414 instead of indicating a channel switch operation via the modified CSA element 412. That is, the new channel number field 424 may indicate a same channel as a current O-Primary channel associated with the O-Primary index indicated via the O-Primary index field 432. The AP and the STA may therefore not perform a channel switch operation and may instead update a puncturing pattern of the O-Primary channel as indicated via the channel switch wrapper element 414. In some examples, the AP 102 may not include a channel switch wrapper element 414 corresponding to one or more modified CSA elements 412 (such as the modified CSA element 412-*a* and the modified CSA element 412-*c*).

The AP 102 may transmit the modified CSA element 412 as an element with an element ID field 416 indicating an element ID that is different than an element ID of a CSA element or an ECSA element (such that the STA 104 may differentiate the CSA element, the ESCA element, and the modified CSA element 412). That is, the AP 102 may use a different element ID for an O-Primary CSA than for an M-Primary CSA. The AP 102 may, additionally, or alternatively, transmit a channel switch wrapper including a wideband CSA element and a TPE element for the O-Primary channel switch with element IDs that are different than element IDs of a wideband CSA element and a TPE element corresponding to an M-Primary channel switch. Such techniques may consume additional element IDs for each of the modified CSA element 412, the wideband CSA element, and the TPE element.

Additionally, or alternatively, the AP 102 may transmit one or more modified CSA elements 412 (and one or more corresponding channel switch wrapper elements 414) via a NPCA wrapper element 402. That is, the NPCA wrapper element may include the one or more modified CSA elements 412 (and the one or more corresponding channel switch wrapper elements 414 following a corresponding modified CSA element 412) via a subelement field 410 of the NPCA wrapper element 402. Each of the one or more modified CSA elements 412 may correspond to a respective O-Primary channel (such as a respective O-Primary channel that the AP 102 will switch).

The NPCA wrapper element 402 may include an element ID field 404 indicating an element ID of the NPCA wrapper element 402, a length field 406 indicating a length of the NPCA wrapper element 402, an element ID extension field 408 indicating an element ID extension (such as an indication that the NPCA wrapper element 402 includes the one or more modified CSA elements 412), and the subelement field 410 including the modified CSA elements 412. In some examples, an element ID indicated via the element ID field (or a subelement ID field) 416 of the modified CSA elements 412 together with the element ID indicated via the element ID extension field 408 may indicate that the modified CSA elements 412 include channel switch information for O-Primary channels. In such examples, the element ID indicated via the element ID field (or the subelement ID field) 416 may be a same element ID as an element ID of a CSA element announcing an M-Primary channel switch. Similarly, an element ID of the wideband CSA element and the TPE element in the channel switch wrapper element 414 may be the same as respective element IDs of a wideband CSA element and a TPE element corresponding to an M-Primary channel switch.

Figure 5:
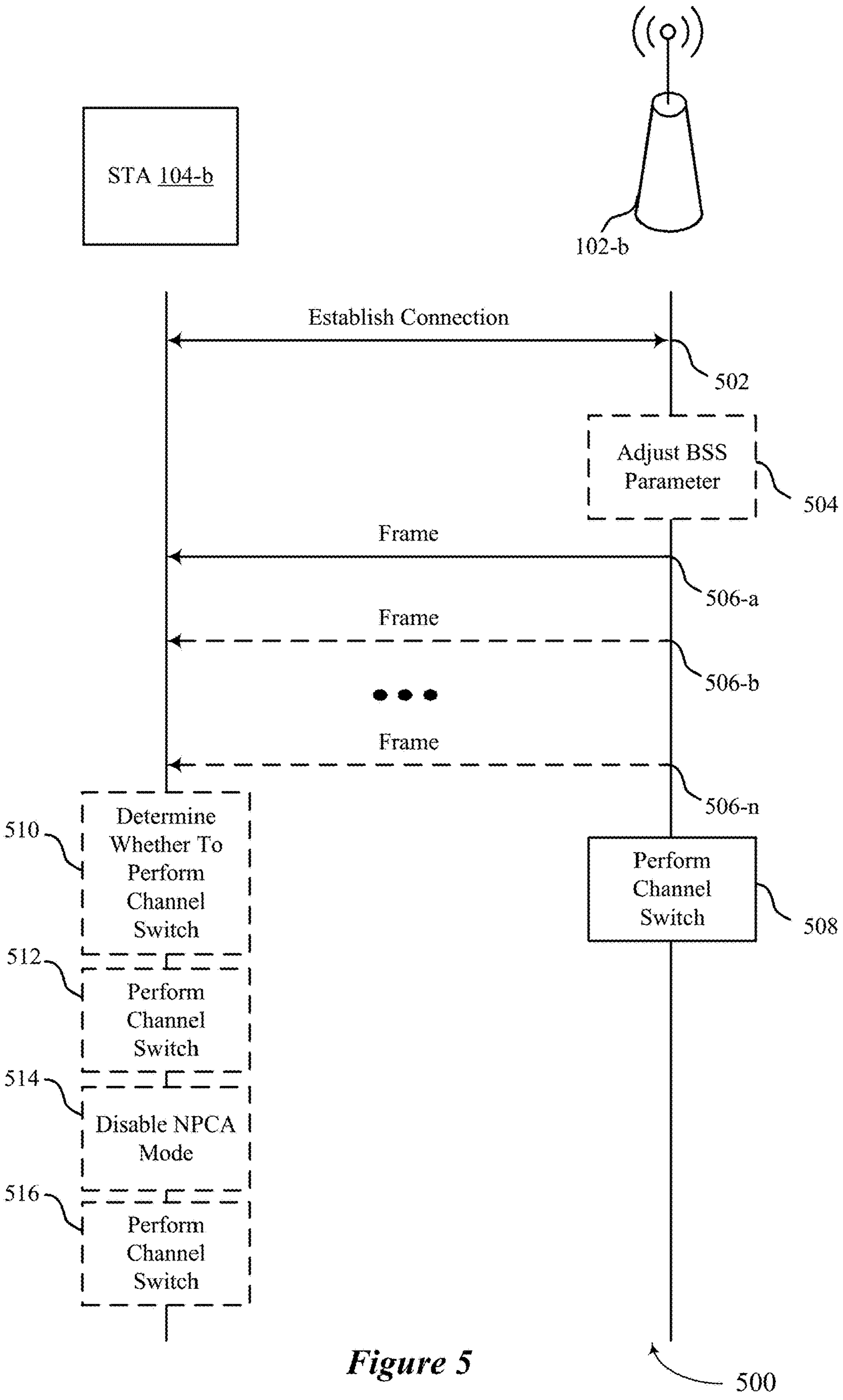
FIG. 5 shows an example of a process flow that supports announcing O-Primary channel switching.

FIG. 5 shows an example of a process flow 500 that supports announcing O-Primary channel switching. The process flow 500 may implement or may be implemented by aspects of the wireless communication network 100, the PPDU 200, the signaling diagram 300, or the frame structure 400. For example, the process flow 500 may be implemented by an AP 102 (such as an AP 102-*b*) or an STA 104 (such as an STA 104-*b*), which may be examples of the corresponding devices as described with reference to FIG. 1.

In the following description of the process flow 500, the operations between the STA 104-*b* and the AP 102-*b* may occur in a different order than the example order shown and in some examples may be performed by one or more different devices other than those shown as examples. Some operations also may be omitted from the process flow 500, and other operations may be added to the process flow 500. Further, although some operations or signaling may be shown to occur at different times for discussion purposes, these operations may actually occur at the same time.

At 502, the AP 102-*b* and the STA 104-*b* may establish a wireless communication link. The wireless communication link may be a link over which the AP 102-*b* may exchange communication with the STA 104-*b*. For example, the wireless communication link may include a BSS bandwidth and one or more channels in the BSS bandwidth, such as an M-Primary channel and one or more O-Primary channels different than the M-Primary channel, over which the AP 102-*b* may transmit messages (such as frames) to the STA 104-*b*.

In some examples, at 504, the AP 102-*b* may adjust (or increment) a value of a BSS parameter change count subfield of a frame. For example, the AP 102-*b* may increment the value of the BSS parameter change count subfield to indicate that the AP 102-*b* will change one or more aspects of the BSS bandwidth (such as the location of the one or more O-Primary channels).

At 506-*a*, the AP 102-*b* may transmit, to the STA 104-*b*, the frame comprising an indication to perform a channel switch operation of at least one of the one or more O-Primary channels. In some examples, the frame may be a beacon frame, a probe response frame, or a dedicated CSA frame. In some examples, the frame may include a CSA element with an element ID field and/or an element ID extension field that may indicate (such as indicating together) that the CSA element includes the indication to perform the channel switch operation.

In some examples, the AP 102-*b* may include the indication to perform the channel switch operation in a CSA element in the frame. The CSA element may include a channel switch mode field with one or more bits indicating whether the STA 104-*b* is permitted to transmit via the one or more O-Primary channels in a duration between a time at which the STA 104-*b* receives the frame and a time at which the AP 102-*b* may perform the channel switch operation. The CSA element may include one or more bits indicating whether the CSA element includes a new operating class field. The new operating class field may indicate a value of an operating class associated with a new O-Primary channel (such as a new O-Primary channel that the AP 102-*a* will switch to).

In some examples, the AP 102-*b* may transmit one or more respective CSA elements each corresponding to each of the one or more O-Primary channels (via the frame). The AP 102-*b* may indicate, in each respective CSA element, an O-Primary identifier field with a respective index of a respective O-Primary channel of the one or more O-Primary channels. The respective index may be a respective frequency location of the respective O-Primary channel (such as whether the O-Primary channel is a lowest 20 MHz channel in the BSS bandwidth, a second lowest 20 MHz channel in the BSS bandwidth, and so on).

In some examples, the frame may include a NPCA wrapper element including the one or more respective CSA elements. The NPCA wrapper element may include an element ID field and an element ID extension field that may together indicate that the NPCA wrapper element includes the one or more respective CSA elements with the indication to perform the channel switch operation.

In some examples, the frame may include a maximum channel switch time element. The maximum channel switch time element may indicate a time duration between a transmission time of the frame (such as a transmission time of the indication to perform the channel switch operation) and a time at which the wireless access point will perform the channel switch operation (such as a time at which the AP 102-*a* may complete the channel switch operation).

In some examples, the frame may include the incremented BSS parameter change count field and/or a capability information field. The capabilities information field may include a critical update flag that may indicate an update to the wireless communications link in accordance with indicating the channel switch operation.

In some examples, at 506-*b* through 506-*n*, the AP 102-*a* may transmit one or more frames comprising the indication to perform the channel switch operation during each of one or more durations before the wireless access point will perform the channel switch operation. For example, the AP 102-*a* may transmit a respective frame carrying a respective CSA element during each of the one or more durations.

At 508, the AP 102-*b* may perform the channel switch operation to switch the one or more O-Primary channels in accordance with the indication. At 510, the STA 104-*b* may determine whether to perform the channel switch operation.

For example, the STA 104-*b* may determine whether a new bandwidth associated with the O-Primary channel is within an operating bandwidth of the STA 104-*b*. The STA 104-*b* may determine to perform one of the operations of 512, 514, and 516 based on the determination.

For example, at 512, the STA 104-*b* may perform the channel switch operation to switch the one or more O-Primary channels in accordance with the indication. Additionally, or alternatively, at 514, the STA 104-*b* may determine not to perform the channel switch operation and may disable a NPCA mode. Additionally, or alternatively, at 516, the STA 104-*b* may perform a channel switch operation to switch one or more of the O-Primary channels to a different one or more new O-Primary channels that one or more new O-Primary channels indicated by the frame (such as via the indication to perform the channel switch operation).

Figure 6:
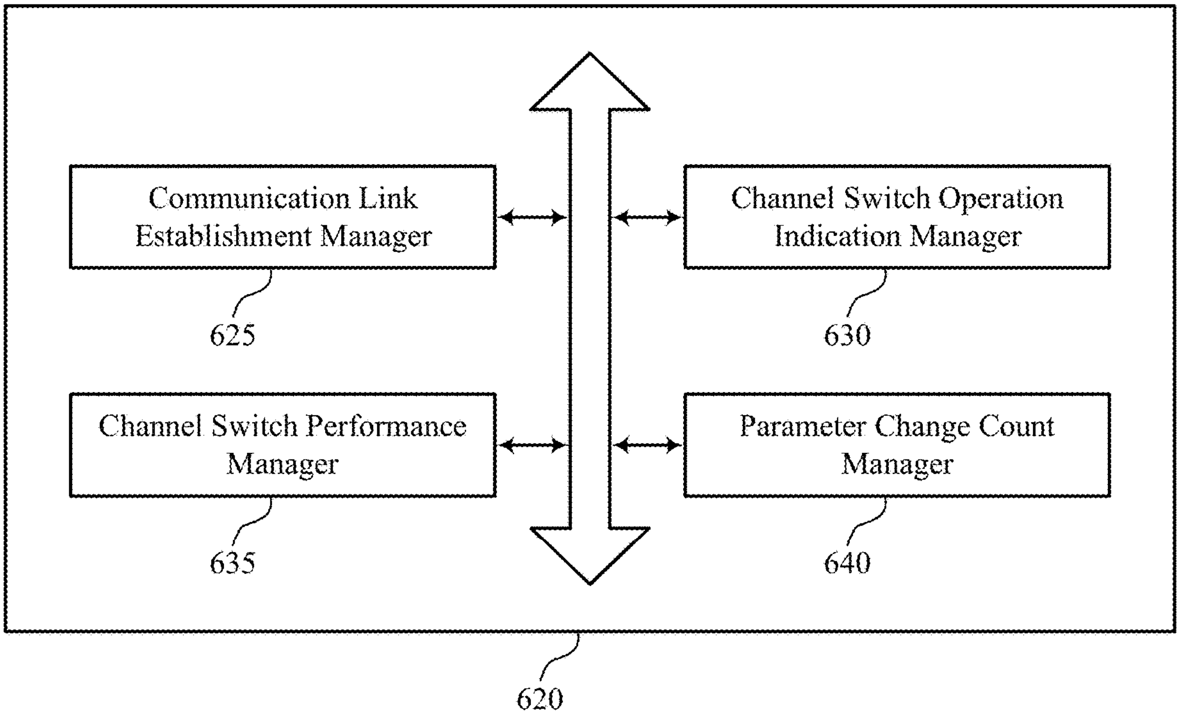
FIG. 6 shows a block diagram of an example wireless communication device that supports announcing O-Primary channel switching.

FIG. 6 shows a block diagram of an example wireless communication device 620 that supports announcing O-Primary channel switching. In some examples, the wireless communication device 620 is configured to perform the processes 800 and 900 described with reference to FIGS. 8 and 9, respectively. The wireless communication device 620 may include one or more chips, SoCs, chipsets, packages, components or devices that individually or collectively constitute or include a processing system. The processing system may interface with other components of the wireless communication device, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device may transmit the information output from the chip. In such an example, the second interface may refer to an interface between the processing system of the chip and a reception component, such that the wireless communication device 620 may receive information that is then passed to the processing system. In some such examples, the first interface also may obtain information, such as from the transmission component, and the second interface also may output information, such as to the reception component.

The processing system of the wireless communication device 620 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 620 can be configurable or configured for use in an AP, such as the AP 102 described with reference to FIG. 1. In some other examples, the wireless communication device 620 can be an AP that includes such a processing system and other components including multiple antennas. The wireless communication device 620 is capable of transmitting and receiving wireless communication in the form of, for example, wireless packets. For example, the wireless communication device 620 can be configurable or configured to transmit and receive packets in the form of physical layer PPDUs and MPDUs conforming to one or more of the IEEE 802.11 family of wireless communication protocol standards. In some other examples, the wireless communication device 620 can be configurable or configured to transmit and receive signals and communication conforming to one or more 3GPP specifications including those for 5G NR or 6G. In some examples, the wireless communication device 620 also includes or can be coupled with one or more application processors which may be further coupled with one or more other memories. In some examples, the wireless communication device 620 further includes at least one external network interface coupled with the processing system that enables communication with a core network or backhaul network that enables the wireless communication device 620 to gain access to external networks including the Internet.

The wireless communication device 620 includes a communication link establishment manager 625, a channel switch operation indication manager 630, a channel switch performance manager 635, and a parameter change count manager 640. Portions of one or more of the communication link establishment manager 625, the channel switch operation indication manager 630, the channel switch performance manager 635, and the parameter change count manager 640 may be implemented at least in part in hardware or firmware. For example, one or more of the communication link establishment manager 625, the channel switch operation indication manager 630, the channel switch performance manager 635, and the parameter change count manager 640 may be implemented at least in part by at least a processor or a modem. In some examples, portions of one or more of the communication link establishment manager 625, the channel switch operation indication manager 630, the channel switch performance manager 635, and the parameter change count manager 640 may be implemented at least in part by a processor and software in the form of processor-executable code stored in memory.

The wireless communication device 620 may support wireless communication in accordance with examples as disclosed herein. The communication link establishment manager 625 is configurable or configured to establish a wireless communication link between a wireless AP and a wireless STA. The channel switch operation indication manager 630 is configurable or configured to transmit, to the wireless STA, a frame including an indication to perform a channel switch operation associated with one or more O-Primary channels associated with the wireless communication link that are different than a M-Primary channel associated with the wireless communication link. The channel switch performance manager 635 is configurable or configured to perform the channel switch operation to switch the one or more O-Primary channels in accordance with transmitting the indication to perform the channel switch operation.

In some examples, the frame includes a CSA element that includes a channel switch mode field including one or more bits indicating whether the wireless STA is permitted to transmit via the one or more O-Primary channels.

In some examples, the frame includes a CSA element that includes one or more bits indicating whether the CSA element includes a new operating class field indicating a value of an operating class associated with a new channel of the one or more O-Primary channels.

In some examples, the frame includes a respective CSA element corresponding to each of the one or more O-Primary channels. In some examples, each respective CSA element includes an O-Primary channel identifier field indicating a respective index of a respective O-Primary channel of the one or more O-Primary channels.

In some examples, the respective index includes an indication of a respective frequency location of the respective O-Primary channel in a basic service set operating bandwidth.

In some examples, the frame includes a non-primary channel access wrapper element that includes a CSA element, an element identifier field, and an element identifier extension field, the element identifier field and the element identifier extension field together indicating that the non-primary channel access wrapper element includes the indication to perform the channel switch operation.

In some examples, the frame includes a maximum channel switch time element indicating a time duration between a transmission time associated with the indication to perform the channel switch operation and a time at which the wireless access point will perform the channel switch operation.

In some examples, the frame includes a CSA element that includes an element identifier field and an element identifier extension field, the element identifier field and the element identifier extension field together indicating that the CSA element includes the indication to perform the channel switch operation.

In some examples, the indication to perform the channel switch operation is transmitted during each of one or more durations before the wireless access point will perform the channel switch operation.

In some examples, the parameter change count manager 640 is configurable or configured to adjust a value of a basic service set parameter change count subfield associated with the wireless AP in accordance with indicating the channel switch operation.

In some examples, the frame includes a capabilities information field that includes a critical update flag, the critical update flag indicating an update to the wireless communication link in accordance with indicating the channel switch operation.

In some examples, the frame includes a beacon frame, a probe response frame, or a CSA frame.

Figure 7:
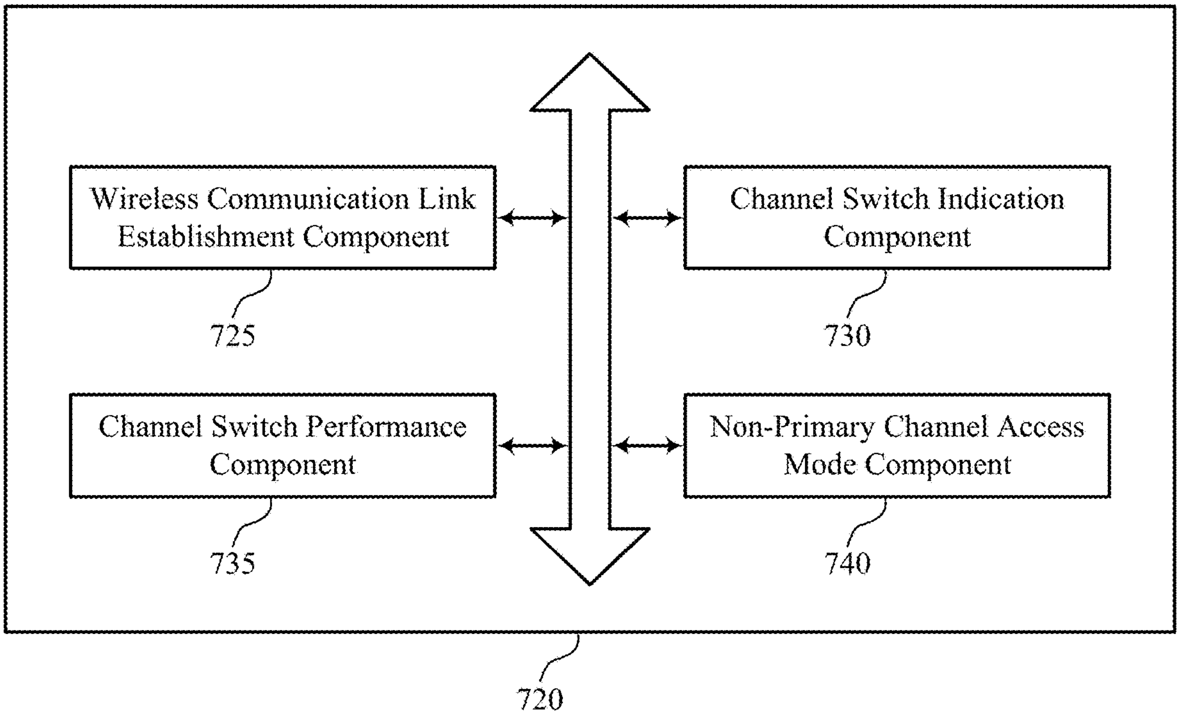
FIG. 7 shows a block diagram of an example wireless communication device that supports announcing O-Primary channel switching.

FIG. 7 shows a block diagram of an example wireless communication device 720 that supports announcing O-Primary channel switching. In some examples, the wireless communication device 720 is configured to perform the processes 1000 and 1100 described with reference to FIGS. 10 and 11, respectively. The wireless communication device 720 may include one or more chips, SoCs, chipsets, packages, components or devices that individually or collectively constitute or include a processing system. The processing system may interface with other components of the wireless communication device 720, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 720 may transmit the information output from the chip. In such an example, the second interface may refer to an interface between the processing system of the chip and a reception component, such that the wireless communication device 720 may receive information that is then passed to the processing system. In some such examples, the first interface also may obtain information, such as from the transmission component, and the second interface also may output information, such as to the reception component.

The processing system of the wireless communication device 720 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 720 can be configurable or configured for use in a STA, such as the STA 104 described with reference to FIG. 1. In some other examples, the wireless communication device 720 can be a STA that includes such a processing system and other components including multiple antennas. The wireless communication device 720 is capable of transmitting and receiving wireless communication in the form of, for example, wireless packets. For example, the wireless communication device 720 can be configurable or configured to transmit and receive packets in the form of physical layer PPDUs and MPDUs conforming to one or more of the IEEE 802.11 family of wireless communication protocol standards. In some other examples, the wireless communication device 720 can be configurable or configured to transmit and receive signals and communication conforming to one or more 3GPP specifications including those for 5G NR or 6G. In some examples, the wireless communication device 720 also includes or can be coupled with one or more application processors which may be further coupled with one or more other memories. In some examples, the wireless communication device 720 further includes a user interface (UI) (such as a touchscreen or keypad) and a display, which may be integrated with the UI to form a touchscreen display that is coupled with the processing system. In some examples, the wireless communication device 720 may further include one or more sensors such as, for example, one or more inertial sensors, accelerometers, temperature sensors, pressure sensors, or altitude sensors, that are coupled with the processing system.

The wireless communication device 720 includes a wireless communication link establishment component 725, a channel switch indication component 730, a channel switch performance component 735, and a non-primary channel access mode component 740. Portions of one or more of the wireless communication link establishment component 725, the channel switch indication component 730, the channel switch performance component 735, and the non-primary channel access mode component 740 may be implemented at least in part in hardware or firmware. For example, one or more of the wireless communication link establishment component 725, the channel switch indication component 730, the channel switch performance component 735, and the non-primary channel access mode component 740 may be implemented at least in part by at least a processor or a modem. In some examples, portions of one or more of the wireless communication link establishment component 725, the channel switch indication component 730, the channel switch performance component 735, and the non-primary channel access mode component 740 may be implemented at least in part by a processor and software in the form of processor-executable code stored in memory.

The wireless communication device 720 may support wireless communication in accordance with examples as disclosed herein. The wireless communication link establishment component 725 is configurable or configured to establish a wireless communication link between a wireless STA and a wireless AP. The channel switch indication component 730 is configurable or configured to receive, from the wireless AP, a frame including an indication to perform a channel switch operation associated with one or more O-Primary channels associated with the wireless communication link that are different than a M-Primary channel associated with the wireless communication link.

In some examples, the channel switch performance component 735 is configurable or configured to perform the channel switch operation to switch the one or more O-Primary channels in accordance with receiving the indication to perform the channel switch operation.

In some examples, the non-primary channel access mode component 740 is configurable or configured to disable a non-primary channel access mode in accordance with determining not to perform the channel switch operation. For example, the non-primary channel access mode component 740 may determine to disable the non-primary channel access mode if a bandwidth associated with the indicated O-Primary channel switch operation is outside of a bandwidth monitored by the wireless communication device 720.

In some examples, the channel switch performance component 735 is configurable or configured to perform a second channel switch operation to switch the one or more O-Primary channels. One or more new O-Primary channels associated with the second channel switch operation are different than one or more new O-Primary channels associated with the indication to perform the channel switch operation.

In some examples, the frame includes a CSA element that includes a channel switch mode field including one or more bits indicating whether the wireless STA is permitted to transmit via the one or more O-Primary channels.

In some examples, the frame includes a CSA element that includes one or more bits indicating whether the CSA element includes a new operating class field indicating a value of an operating class associated with a new channel of the one or more O-Primary channels.

In some examples, the frame includes a respective CSA element corresponding to each of the one or more O-Primary channels. In some examples, each respective CSA element includes an O-Primary channel identifier field indicating a respective index of a respective O-Primary channel of the one or more O-Primary channels.

In some examples, the respective index includes an indication of a respective frequency location of the respective O-Primary channel in a basic service set operating bandwidth.

In some examples, the frame includes a non-primary channel access wrapper element that includes a CSA element, an element identifier field, and an element identifier extension field, the element identifier field and the element identifier extension field together indicating that the non-primary channel access wrapper element includes the indication to perform the channel switch operation.

In some examples, the frame includes a maximum channel switch time element indicating a time duration between a transmission time associated with the indication to perform the channel switch operation and a time at which the wireless access point will perform the channel switch operation.

In some examples, the frame includes a CSA element that includes an element identifier field and an element identifier extension field, the element identifier field and the element identifier extension field together indicating that the CSA element includes the indication to perform the channel switch operation.

In some examples, the indication to perform the channel switch operation is received during each of one or more durations before the channel switch operation.

In some examples, the frame includes a beacon frame or a probe response frame or a CSA frame.

In some examples, the frame includes a capabilities information field that includes a critical update flag, the critical update flag indicating an update to the wireless communication link in accordance with indicating the channel switch operation.

Figure 8:
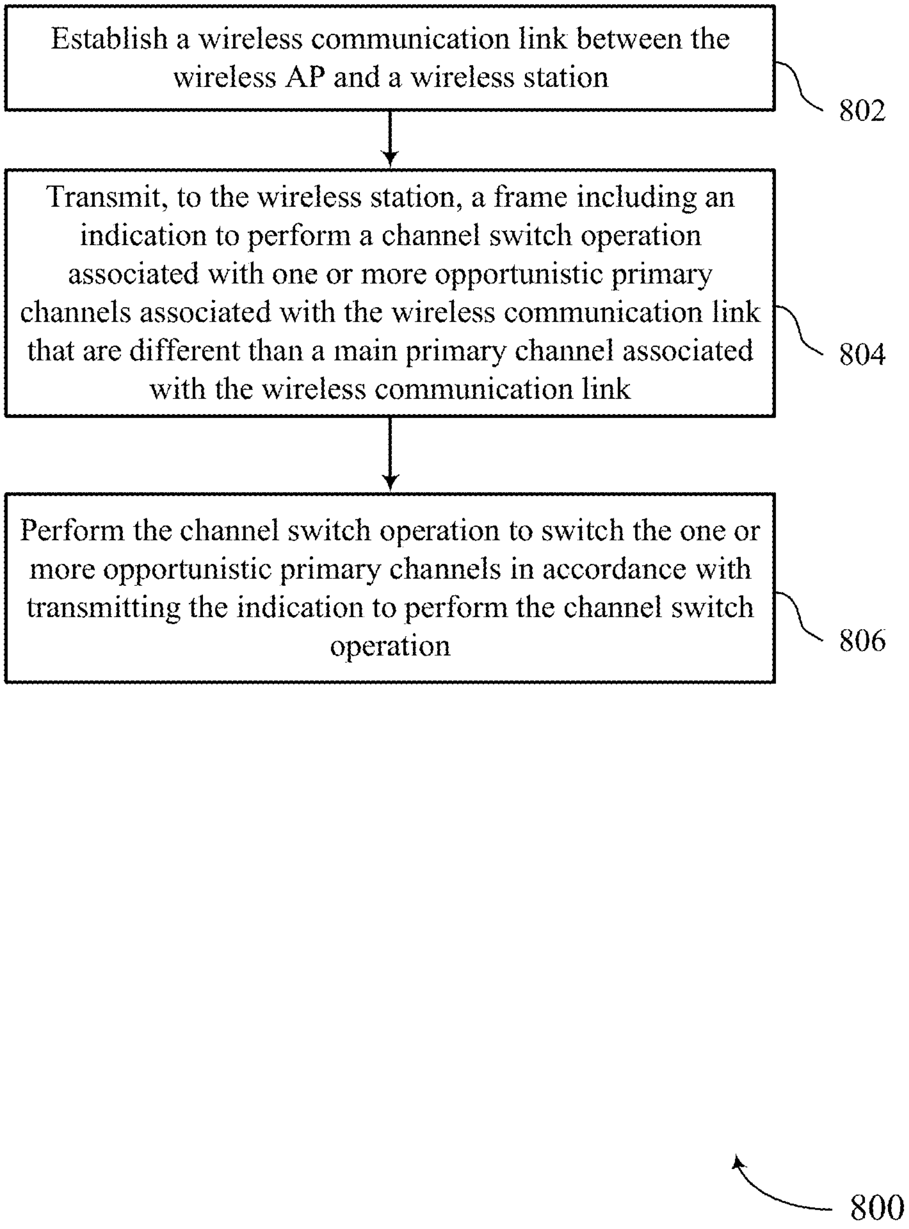
FIGS. 8 and 9 show flowcharts illustrating example processes performable by or at a wireless access point that supports announcing O-Primary channel switching.

FIG. 8 shows a flowchart illustrating an example process 800 performable by or at a wireless AP that supports announcing O-Primary channel switching. The operations of the process 800 may be implemented by a wireless AP or its components. For example, the process 800 may be performed by a wireless communication device 620, such as the wireless communication device 620 described with reference to FIG. 6, operating as or within a wireless AP. In some examples, the process 800 may be performed by a wireless AP, such as one of the APs 102 described with reference to FIG. 1.

In some examples, in 802, the wireless AP may establish a wireless communication link between the wireless AP and a wireless STA. The operations of 802 may be performed in accordance with examples as disclosed herein. In some implementations, aspects of the operations of 802 may be performed by a communication link establishment manager 625 as described with reference to FIG. 6.

In some examples, in 804, the wireless AP may transmit, to the wireless STA, a frame including an indication to perform a channel switch operation associated with one or more O-Primary channels associated with the wireless communication link that are different than a M-Primary channel associated with the wireless communication link. The operations of 804 may be performed in accordance with examples as disclosed herein. In some implementations, aspects of the operations of 804 may be performed by a channel switch operation indication manager 630 as described with reference to FIG. 6.

In some examples, in 806, the wireless AP may perform the channel switch operation to switch the one or more O-Primary channels in accordance with transmitting the indication to perform the channel switch operation. The operations of 806 may be performed in accordance with examples as disclosed herein. In some implementations, aspects of the operations of 806 may be performed by a channel switch performance manager 635 as described with reference to FIG. 6.

Figure 9:
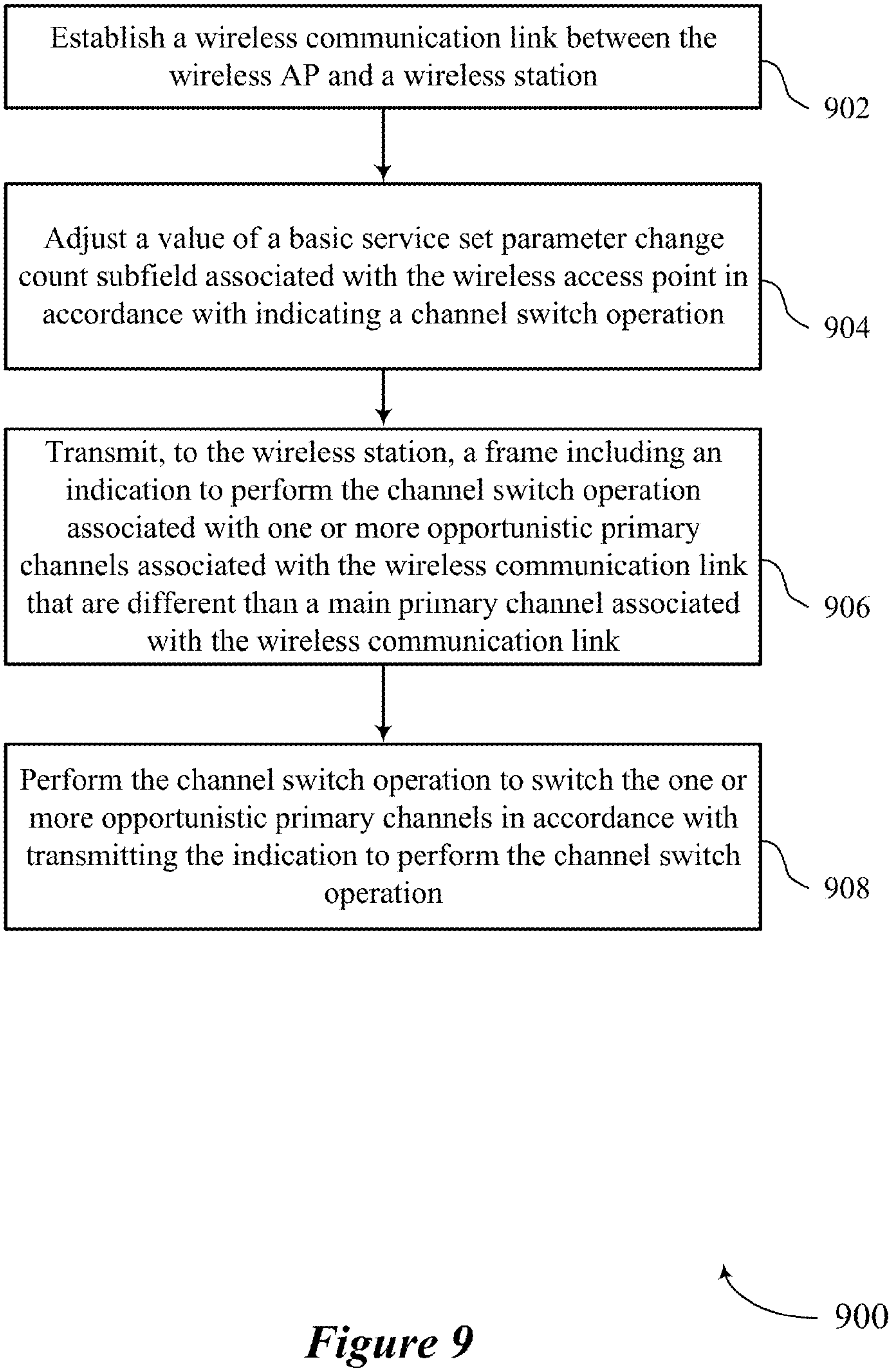

FIG. 9 shows a flowchart illustrating an example process 900 performable by or at a wireless AP that supports announcing O-Primary channel switching. The operations of the process 900 may be implemented by a wireless AP or its components. For example, the process 900 may be performed by a wireless communication device 620, such as the wireless communication device 620 described with reference to FIG. 6, operating as or within a wireless AP. In some examples, the process 900 may be performed by a wireless AP, such as one of the APs 102 described with reference to FIG. 1. In some examples, the process 900 may be performed by an AP MLD.

In some examples, in 902, the wireless AP may establish a wireless communication link between the wireless AP and a wireless STA. The operations of 902 may be performed in accordance with examples as disclosed herein. In some implementations, aspects of the operations of 902 may be performed by a communication link establishment manager 625 as described with reference to FIG. 6.

In some examples, in 904, the wireless AP may adjust a value of a basic service set parameter change count subfield associated with the wireless AP in accordance with indicating a channel switch operation. The operations of 904 may be performed in accordance with examples as disclosed herein. In some implementations, aspects of the operations of 904 may be performed by a parameter change count manager 640 as described with reference to FIG. 6.

In some examples, in 906, the wireless AP may transmit, to the wireless STA, a frame including an indication to perform the channel switch operation associated with one or more O-Primary channels associated with the wireless communication link that are different than a M-Primary channel associated with the wireless communication link. The operations of 906 may be performed in accordance with examples as disclosed herein. In some implementations, aspects of the operations of 906 may be performed by a channel switch operation indication manager 630 as described with reference to FIG. 6.

In some examples, in 908, the wireless AP may perform the channel switch operation to switch the one or more O-Primary channels in accordance with transmitting the indication to perform the channel switch operation. The operations of 908 may be performed in accordance with examples as disclosed herein. In some implementations, aspects of the operations of 908 may be performed by a channel switch performance manager 635 as described with reference to FIG. 6.

Figure 10:
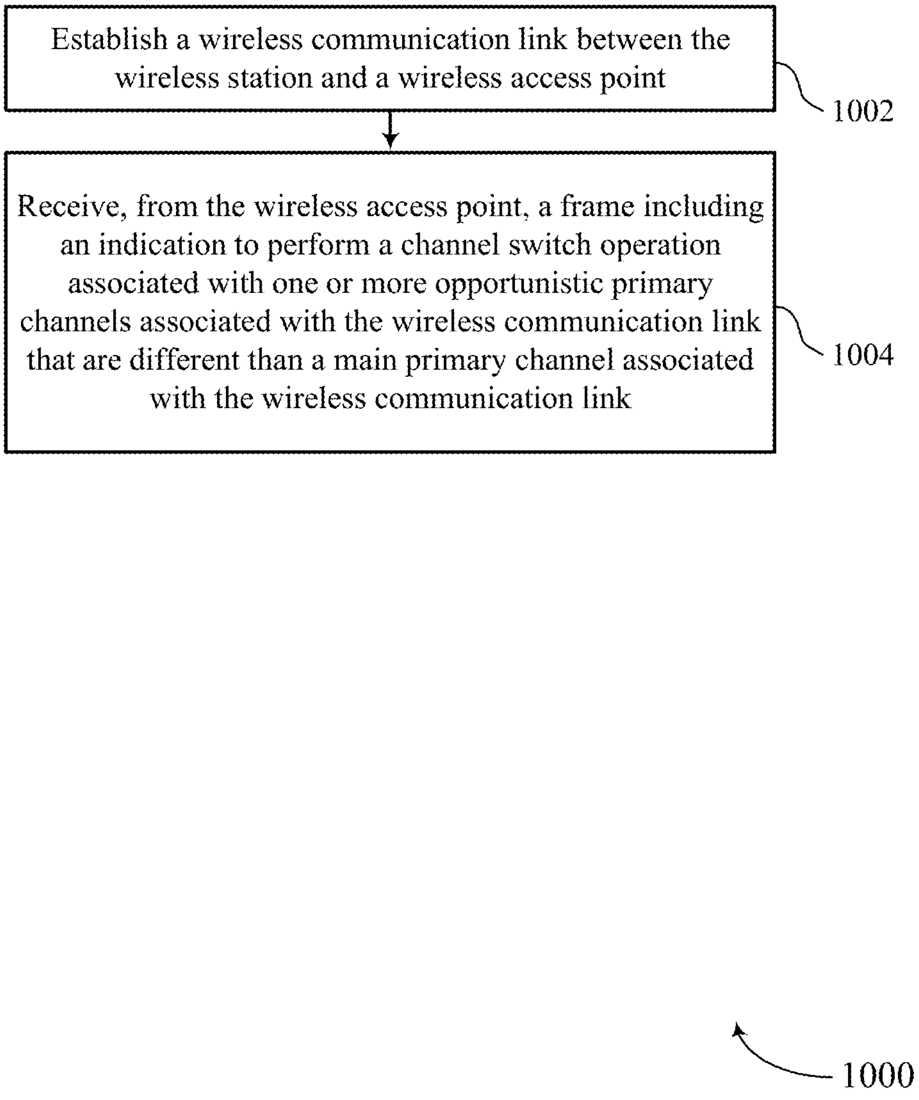
FIGS. 10 and 11 show flowcharts illustrating example processes performable by or at a wireless station that supports announcing O-Primary channel switching.

FIG. 10 shows a flowchart illustrating an example process 1000 performable by or at a wireless STA that supports announcing O-Primary channel switching. The operations of the process 1000 may be implemented by a wireless STA or its components. For example, the process 1000 may be performed by a wireless communication device 720, such as the wireless communication device 720 described with reference to FIG. 7, operating as or within a wireless STA. In some examples, the process 1000 may be performed by a wireless STA, such as one of the STAs 104 described with reference to FIG. 1.

In some examples, in 1002, the wireless STA may establish a wireless communication link between the wireless STA and a wireless AP. The operations of 1002 may be performed in accordance with examples as disclosed herein. In some implementations, aspects of the operations of 1002 may be performed by a wireless communication link establishment component 725 as described with reference to FIG. 7.

In some examples, in 1004, the wireless STA may receive, from the wireless AP, a frame including an indication to perform a channel switch operation associated with one or more O-Primary channels associated with the wireless communication link that are different than a M-Primary channel associated with the wireless communication link. The operations of 1004 may be performed in accordance with examples as disclosed herein. In some implementations, aspects of the operations of 1004 may be performed by a channel switch indication component 730 as described with reference to FIG. 7.

Figure 11:
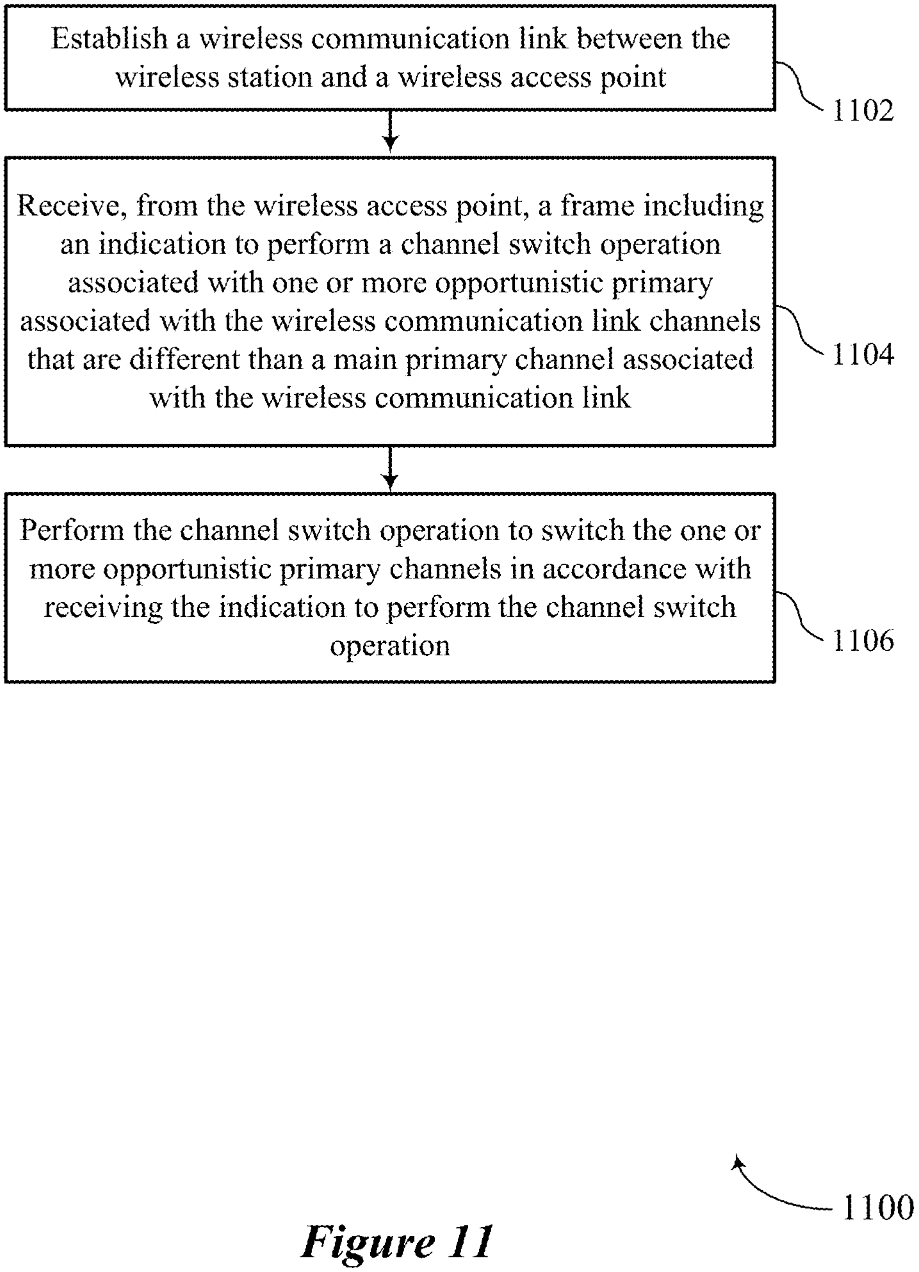

FIG. 11 shows a flowchart illustrating an example process 1100 performable by or at a wireless STA that supports announcing O-Primary channel switching. The operations of the process 1100 may be implemented by a wireless STA or its components. For example, the process 1100 may be performed by a wireless communication device 720, such as the wireless communication device 720 described with reference to FIG. 7, operating as or within a wireless STA. In some examples, the process 1100 may be performed by a wireless STA, such as one of the STAs 104 described with reference to FIG. 1.

In some examples, in 1102, the wireless STA may establish a wireless communication link between the wireless STA and a wireless AP. The operations of 1102 may be performed in accordance with examples as disclosed herein. In some implementations, aspects of the operations of 1102 may be performed by a wireless communication link establishment component 725 as described with reference to FIG. 7.

In some examples, in 1104, the wireless STA may receive, from the wireless AP, a frame including an indication to perform a channel switch operation associated with one or more O-Primary channels associated with the wireless communication link that are different than a M-Primary channel associated with the wireless communication link. The operations of 1104 may be performed in accordance with examples as disclosed herein. In some implementations, aspects of the operations of 1104 may be performed by a channel switch indication component 730 as described with reference to FIG. 7.

In some examples, in 1106, the wireless STA may perform the channel switch operation to switch the one or more O-Primary channels in accordance with receiving the indication to perform the channel switch operation. The operations of 1106 may be performed in accordance with examples as disclosed herein. In some implementations, aspects of the operations of 1106 may be performed by a channel switch performance component 735 as described with reference to FIG. 7.

Implementation examples are described in the following numbered clauses:

The following provides an overview of aspects of the present disclosure:

Aspect 1: A method for wireless communication by a wireless AP, comprising: establishing a wireless communication link between the wireless AP and a wireless STA; transmitting, to the wireless STA, a frame comprising an indication to perform a channel switch operation associated with one or more O-Primary channels associated with the wireless communication link that are different than a M-Primary channel associated with the wireless communication link; and performing the channel switch operation to switch the one or more O-Primary channels in accordance with transmitting the indication to perform the channel switch operation.

Aspect 2: The method of aspect 1, wherein the frame comprises a CSA element that includes a channel switch mode field comprising one or more bits indicating whether the wireless STA is permitted to transmit via the one or more O-Primary channels.

Aspect 3: The method of any of aspects 1-2, wherein the frame comprises a CSA element that includes one or more bits indicating whether the CSA element includes a new operating class field indicating a value of an operating class associated with a new channel of the one or more O-Primary channels.

Aspect 4: The method of any of aspects 1-3, wherein the frame comprises a respective CSA element corresponding to each of the one or more O-Primary channels, and each respective CSA element comprises an O-Primary channel ID field indicating a respective index of a respective O-Primary channel of the one or more O-Primary channels.

Aspect 5: The method of aspect 4, wherein the respective index comprises an indication of a respective frequency location of the respective O-Primary channel in a BSS operating bandwidth.

Aspect 6: The method of any of aspects 1-5, wherein the frame comprises a NPCA wrapper element that includes a CSA element, an element ID field, and an element ID extension field, the element ID field and the element ID extension field together indicating that the NPCA wrapper element comprises the indication to perform the channel switch operation.

Aspect 7: The method of any of aspects 1-6, wherein the frame comprises a maximum channel switch time element indicating a time duration between a transmission time associated with the indication to perform the channel switch operation and a time at which the wireless access point will perform the channel switch operation.

Aspect 8: The method of any of aspects 1-7, wherein the frame comprises a CSA element that includes an element ID field and an element ID extension field, the element ID field and the element ID extension field together indicating that the CSA element comprises the indication to perform the channel switch operation.

Aspect 9: The method of any of aspects 1-8, wherein the indication to perform the channel switch operation is transmitted during each of one or more durations before the wireless access point will perform the channel switch operation.

Aspect 10: The method of any of aspects 1-9, further comprising: adjusting a value of a BSS parameter change count subfield associated with the wireless AP in accordance with performing the channel switch operation.

Aspect 11: The method of any of aspects 1-10, wherein the frame comprises a capabilities information field that includes a critical update flag, the critical update flag indicating an update to the wireless communication link in accordance with performing the channel switch operation.

Aspect 12: The method of any of aspects 1-11, wherein the frame comprises a beacon frame, a probe response frame, or a CSA frame.

Aspect 13: A method for wireless communication by a wireless STA, comprising: establishing a wireless communication link between the wireless STA and a wireless AP; and receiving, from the wireless AP, a frame comprising an indication to perform a channel switch operation associated with one or more O-Primary channels associated with the wireless communication link that are different than a M-Primary channel associated with the wireless communication link.

Aspect 14: The method of aspect 13, further comprising: performing the channel switch operation to switch the one or more O-Primary channels in accordance with receiving the indication to perform the channel switch operation.

Aspect 15: The method of any of aspects 13-14, further comprising: disabling a NPCA mode in accordance with determining not to perform the channel switch operation.

Aspect 16: The method of any of aspects 13-15, further comprising: performing a second channel switch operation to switch the one or more O-Primary channels, wherein one or more new O-Primary channels associated with the second channel switch operation are different from one or more new O-Primary channels associated with the indication to perform the channel switch operation.

Aspect 17: The method of any of aspects 13-16, wherein the frame comprises a CSA element that includes a channel switch mode field comprising one or more bits indicating whether the wireless STA is permitted to transmit via the one or more O-Primary channels.

Aspect 18: The method of any of aspects 13-17, wherein the frame comprises a CSA element that includes one or more bits indicating whether the CSA element includes a new operating class field indicating a value of an operating class associated with a new channel of the one or more O-Primary channels.

Aspect 19: The method of any of aspects 13-18, wherein the frame comprises a respective CSA element corresponding to each of the one or more O-Primary channels, and each respective CSA element comprises an O-Primary channel ID field indicating a respective index of a respective O-Primary channel of the one or more O-Primary channels.

Aspect 20: The method of aspect 19, wherein the respective index comprises an indication of a respective frequency location of the respective O-Primary channel in a BSS operating bandwidth.

Aspect 21: The method of any of aspects 13-20, wherein the frame comprises a NPCA wrapper element that includes a CSA element, an element ID field, and an element ID extension field, the element ID field and the element ID extension field together indicating that the NPCA wrapper element comprises the indication to perform the channel switch operation.

Aspect 22: The method of any of aspects 13-21, wherein the frame comprises a maximum channel switch time element indicating a time duration between a transmission time associated with the indication to perform the channel switch operation and a time at which the wireless access point will perform the channel switch operation.

Aspect 23: The method of any of aspects 13-22, wherein the frame comprises a CSA element that includes an element ID field and an element ID extension field, the element ID field and the element ID extension field together indicating that the CSA element comprises the indication to perform the channel switch operation.

Aspect 24: The method of any of aspects 13-23, wherein the indication to perform the channel switch operation is received during each of one or more durations before the channel switch operation.

Aspect 25: The method of any of aspects 13-24, wherein the frame comprises a beacon frame or a probe response frame or a CSA frame.

Aspect 26: The method of any of aspects 13-25, wherein the frame comprises a capabilities information field that includes a critical update flag, the critical update flag indicating an update to the wireless communication link in accordance with performing the channel switch operation.

Aspect 27: A wireless AP for wireless communication, comprising one or more memories storing processor-executable code, and one or more processors coupled with the one or more memories and individually or collectively operable to execute the code to cause the wireless AP to perform a method of any of aspects 1-12.

Aspect 28: A wireless AP for wireless communication, comprising at least one means for performing a method of any of aspects 1-12.

Aspect 29: A non-transitory computer-readable medium storing code for wireless communication, the code comprising instructions executable by one or more processors to perform a method of any of aspects 1-12.

Aspect 30: A wireless STA for wireless communication, comprising one or more memories storing processor-executable code, and one or more processors coupled with the one or more memories and individually or collectively operable to execute the code to cause the wireless STA to perform a method of any of aspects 13-26.

Aspect 31: A wireless STA for wireless communication, comprising at least one means for performing a method of any of aspects 13-26.

Aspect 32: A non-transitory computer-readable medium storing code for wireless communication, the code comprising instructions executable by one or more processors to perform a method of any of aspects 13-26.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless access point, comprising:

a plurality of antennas; and a processing system, coupled with the plurality of antennas, that includes processor circuitry and memory circuitry that stores code, the processing system configured to cause the wireless access point to:

establish a wireless communication link between the wireless access point and a wireless station, the wireless communication link comprising a main primary channel and one or more first opportunistic primary channels that are different than the main primary channel;

transmit, to the wireless station, a frame comprising an indication to perform a channel switch operation from the one or more first opportunistic primary channels to one or more second opportunistic primary channels associated with the wireless communication link; and perform the channel switch operation to switch from the one or more first opportunistic primary channels to the one or more second opportunistic primary channels in accordance with transmitting the indication to perform the channel switch operation.

2. The wireless access point of claim 1, wherein the frame comprises a channel switch announcement element that includes a channel switch mode field comprising one or more bits indicating whether the wireless station is permitted to transmit via the one or more first opportunistic primary channels.

3. The wireless access point of claim 1, wherein the frame comprises a channel switch announcement element that includes one or more bits indicating whether the channel switch announcement element includes a new operating class field indicating a value of an operating class associated with a channel of the one or more second opportunistic primary channels.

4. The wireless access point of claim 1, wherein the frame comprises a respective channel switch announcement element corresponding to each of the one or more first opportunistic primary channels, and wherein each respective channel switch announcement element comprises an opportunistic primary channel identifier field indicating a respective index of a respective opportunistic primary channel of the one or more first opportunistic primary channels.

5. The wireless access point of claim 4, wherein the respective index comprises an indication of a respective frequency location of the respective opportunistic primary channel in a basic service set operating bandwidth.

6. The wireless access point of claim 1, wherein the frame comprises a non-primary channel access wrapper element that includes a channel switch announcement element, an element identifier field, and an element identifier extension field, the element identifier field and the element identifier extension field together indicating that the non-primary channel access wrapper element comprises the indication to perform the channel switch operation.

7. The wireless access point of claim 1, wherein the frame comprises a maximum channel switch time element indicating a time duration between a transmission time associated with the indication to perform the channel switch operation and a time at which the wireless access point will perform the channel switch operation.

8. The wireless access point of claim 1, wherein the frame comprises a channel switch announcement element that includes an element identifier field and an element identifier extension field, the element identifier field and the element identifier extension field together indicating that the channel switch announcement element comprises the indication to perform the channel switch operation.

9. The wireless access point of claim 1, wherein the indication to perform the channel switch operation is transmitted during each of one or more durations before the wireless access point will perform the channel switch operation.

10. The wireless access point of claim 1, wherein the processing system is further configured to cause the wireless access point to adjust a value of a basic service set parameter change count subfield associated with the wireless access point in accordance with indicating the channel switch operation.

11. The wireless access point of claim 1, wherein the frame comprises a capabilities information field that includes a critical update flag, the critical update flag indicating an update to the wireless communication link in accordance with indicating the channel switch operation.

12. The wireless access point of claim 1, wherein the frame comprises a beacon frame, a probe response frame, or a channel switch announcement frame.

13. A wireless station, comprising:

a plurality of antennas; and a processing system, coupled with the plurality of antennas, that includes processor circuitry and memory circuitry that stores code, the processing system configured to cause the wireless station to:

establish a wireless communication link between the wireless station and a wireless access point, the wireless communication link comprising a main primary channel and one or more first opportunistic primary channels that are different than the main primary channel; and receive, from the wireless access point, a frame comprising an indication to perform a channel switch operation from the one or more first opportunistic primary channels to one or more second opportunistic primary channels associated with the wireless communication link.

14. The wireless station of claim 13, wherein the processing system is further configured to cause the wireless station to perform the channel switch operation to switch the one or more first opportunistic primary channels in accordance with receiving the indication to perform the channel switch operation.

15. The wireless station of claim 13, wherein the processing system is further configured to cause the wireless station to disable a non-primary channel access mode in accordance with determining not to perform the channel switch operation.

16. The wireless station of claim 13, wherein the processing system is further configured to cause the wireless station to perform a second channel switch operation to switch the one or more first opportunistic primary channels, wherein one or more third opportunistic primary channels associated with the second channel switch operation are different than the one or more second opportunistic primary channels associated with the indication to perform the channel switch operation.

17. The wireless station of claim 13, wherein the frame comprises a channel switch announcement element that includes a channel switch mode field comprising one or more bits indicating whether the wireless station is permitted to transmit via the one or more first opportunistic primary channels.

18. The wireless station of claim 13, wherein the frame comprises a channel switch announcement element that includes one or more bits indicating whether the channel switch announcement element includes a new operating class field indicating a value of an operating class associated with a channel of the one or more second opportunistic primary channels.

19. The wireless station of claim 13, wherein the frame comprises a respective channel switch announcement element corresponding to each of the one or more first opportunistic primary channels, and wherein each respective channel switch announcement element comprises an opportunistic primary channel identifier field indicating a respective index of a respective opportunistic primary channel of the one or more first opportunistic primary channels.

20. The wireless station of claim 19, wherein the respective index comprises an indication of a respective frequency location of the respective opportunistic primary channel in a basic service set operating bandwidth.

21. The wireless station of claim 13, wherein the frame comprises a non-primary channel access wrapper element that includes a channel switch announcement element, an element identifier field, and an element identifier extension field, the element identifier field and the element identifier extension field together indicating that the non-primary channel access wrapper element comprises the indication to perform the channel switch operation.

22. The wireless station of claim 13, wherein the frame comprises a maximum channel switch time element indicating a time duration between a transmission time associated with the indication to perform the channel switch operation and a time at which the wireless access point will perform the channel switch operation.

23. The wireless station of claim 13, wherein the frame comprises a channel switch announcement element that includes an element identifier field and an element identifier extension field, the element identifier field and the element identifier extension field together indicating that the channel switch announcement element comprises the indication to perform the channel switch operation.

24. The wireless station of claim 13, wherein the indication to perform the channel switch operation is received during each of one or more durations before the channel switch operation at the wireless access point.

25. The wireless station of claim 13, wherein the frame comprises a beacon frame or a probe response frame or a channel switch announcement frame.

26. The wireless station of claim 13, wherein the frame comprises a capabilities information field that includes a critical update flag, the critical update flag indicating an update to the wireless communication link in accordance with indicating the channel switch operation.

27. A method for wireless communication by a wireless access point, comprising:

establishing a wireless communication link between the wireless access point and a wireless station, the wireless communication link comprising a main primary channel and one or more first opportunistic primary channels that are different than the main primary channel;

transmitting, to the wireless station, a frame comprising an indication to perform a channel switch operation from the one or more first opportunistic primary channels to one or more second opportunistic primary channels associated with the wireless communication link; and performing the channel switch operation to switch from the one or more first opportunistic primary channels to the one or more second opportunistic primary channels in accordance with transmitting the indication to perform the channel switch operation.

28. The method of claim 27, wherein the frame comprises a channel switch announcement element that includes a channel switch mode field comprising one or more bits indicating whether the wireless station is permitted to transmit via the one or more first opportunistic primary channels.

29. The method of claim 27, wherein the frame comprises a channel switch announcement element that includes one or more bits indicating whether the channel switch announcement element includes a new operating class field indicating a value of an operating class associated with a channel of the one or more second opportunistic primary channels.

30. The method of claim 27, wherein the frame comprises a respective channel switch announcement element corresponding to each of the one or more first opportunistic primary channels, and wherein each respective channel switch announcement element comprises an opportunistic primary channel identifier field indicating a respective index of a respective opportunistic primary channel of the one or more first opportunistic primary channels.

31. The method of claim 30, wherein the respective index comprises an indication of a respective frequency location of the respective opportunistic primary channel in a basic service set operating bandwidth.

32. The method of claim 27, wherein the frame comprises a non-primary channel access wrapper element that includes a channel switch announcement element, an element identifier field, and an element identifier extension field, the element identifier field and the element identifier extension field together indicating that the non-primary channel access wrapper element comprises the indication to perform the channel switch operation.

33. The method of claim 27, wherein the frame comprises a maximum channel switch time element indicating a time duration between a transmission time associated with the indication to perform the channel switch operation and a time at which the wireless access point will perform the channel switch operation.

34. The method of claim 27, wherein the frame comprises a channel switch announcement element that includes an element identifier field and an element identifier extension field, the element identifier field and the element identifier extension field together indicating that the channel switch announcement element comprises the indication to perform the channel switch operation.

35. The method of claim 27, wherein the indication to perform the channel switch operation is transmitted during each of one or more durations before the wireless access point will perform the channel switch operation.

36. The method of claim 27, further comprising adjusting a value of a basic service set parameter change count subfield associated with the wireless access point in accordance with indicating the channel switch operation.

37. The method of claim 27, wherein the frame comprises a capabilities information field that includes a critical update flag, the critical update flag indicating an update to the wireless communication link in accordance with indicating the channel switch operation.

38. The method of claim 27, wherein the frame comprises a beacon frame, a probe response frame, or a channel switch announcement frame.

39. A method for wireless communication by a wireless station, comprising:

establishing a wireless communication link between the wireless station and a wireless access point, the wireless communication link comprising a main primary channel and one or more first opportunistic primary channels that are different than the main primary channel; and receiving, from the wireless access point, a frame comprising an indication to perform a channel switch operation from the one or more first opportunistic primary channels to one or more second opportunistic primary channels associated with the wireless communication link.

40. The method of claim 39, further comprising performing the channel switch operation to switch the one or more first opportunistic primary channels in accordance with receiving the indication to perform the channel switch operation.

41. The method of claim 39, further comprising disabling a non-primary channel access mode in accordance with determining not to perform the channel switch operation.

42. The method of claim 39, further comprising performing a second channel switch operation to switch the one or more first opportunistic primary channels, wherein one or more third opportunistic primary channels associated with the second channel switch operation are different than the one or more second opportunistic primary channels associated with the indication to perform the channel switch operation.

43. The method of claim 39, wherein the frame comprises a channel switch announcement element that includes a channel switch mode field comprising one or more bits indicating whether the wireless station is permitted to transmit via the one or more first opportunistic primary channels.

44. The method of claim 39, wherein the frame comprises a channel switch announcement element that includes one or more bits indicating whether the channel switch announcement element includes a new operating class field indicating a value of an operating class associated with a channel of the one or more second opportunistic primary channels.

45. The method of claim 39, wherein the frame comprises a respective channel switch announcement element corresponding to each of the one or more first opportunistic primary channels, and wherein each respective channel switch announcement element comprises an opportunistic primary channel identifier field indicating a respective index of a respective opportunistic primary channel of the one or more first opportunistic primary channels.

46. The method of claim 45, wherein the respective index comprises an indication of a respective frequency location of the respective opportunistic primary channel in a basic service set operating bandwidth.

47. The method of claim 39, wherein the frame comprises a non-primary channel access wrapper element that includes a channel switch announcement element, an element identifier field, and an element identifier extension field, the element identifier field and the element identifier extension field together indicating that the non-primary channel access wrapper element comprises the indication to perform the channel switch operation.

48. The method of claim 39, wherein the frame comprises a maximum channel switch time element indicating a time duration between a transmission time associated with the indication to perform the channel switch operation and a time at which the wireless access point will perform the channel switch operation.

49. The method of claim 39, wherein the frame comprises a channel switch announcement element that includes an element identifier field and an element identifier extension field, the element identifier field and the element identifier extension field together indicating that the channel switch announcement element comprises the indication to perform the channel switch operation.

50. The method of claim 39, wherein the indication to perform the channel switch operation is received during each of one or more durations before the channel switch operation.

51. The method of claim 39, wherein the frame comprises a beacon frame or a probe response frame or a channel switch announcement frame.

52. The method of claim 39, wherein the frame comprises a capabilities information field that includes a critical update flag, the critical update flag indicating an update to the wireless communication link in accordance with indicating the channel switch operation.

* * * * *